(12) United States Patent
Klein

(10) Patent No.: US 9,084,171 B2
(45) Date of Patent: Jul. 14, 2015

(54) PREDICTIVE HARD AND SOFT HANDOVER

(75) Inventor: Robert Klein, Manchester, CT (US)

(73) Assignee: AT&T MOBILITY II LLC, Atlanta, GA (US)

( * ) Notice: Subject to any disclaimer, the term of this patent is extended or adjusted under 35 U.S.C. 154(b) by 758 days.

(21) Appl. No.: 12/557,254

(22) Filed: Sep. 10, 2009

(65) Prior Publication Data

US 2011/0059741 A1 Mar. 10, 2011

(51) Int. Cl.
    *H04W 36/00* (2009.01)
    *H04W 36/30* (2009.01)
    *H04W 36/24* (2009.01)
    *H04W 72/08* (2009.01)
    *H04B 17/00* (2015.01)

(52) U.S. Cl.
    CPC ........... *H04W 36/30* (2013.01); *H04B 17/0057* (2013.01); *H04W 36/00* (2013.01); *H04W 72/085* (2013.01); *H04B 17/006* (2013.01); *H04W 36/24* (2013.01)

(58) Field of Classification Search
    CPC ..... H04W 36/00; H04W 36/08; H04W 36/14; H04W 36/16; H04W 36/24; H04W 36/30; H04W 72/085; H04B 17/0057; H04B 17/006
    USPC .......... 370/331–334, 337, 468; 455/436–444, 455/67.11, 450–454
    See application file for complete search history.

(56) References Cited

U.S. PATENT DOCUMENTS

| | | | | |
|---|---|---|---|---|
| 4,556,760 | A * | 12/1985 | Goldman | 455/436 |
| 5,682,416 | A * | 10/1997 | Schmidt et al. | 455/436 |
| 6,445,917 | B1 * | 9/2002 | Bark et al. | 455/423 |
| 7,092,709 | B1 * | 8/2006 | Honkala et al. | 455/432.1 |
| 7,408,901 | B1 * | 8/2008 | Narayanabhatla | 370/331 |
| 2005/0014515 | A1 * | 1/2005 | Suzuki | 455/456.1 |
| 2006/0094430 | A1 | 5/2006 | Shah | |
| 2006/0116126 | A1 * | 6/2006 | Hidaka | 455/436 |
| 2008/0220784 | A1 * | 9/2008 | Somasundaram et al. | 455/437 |
| 2009/0059871 | A1 * | 3/2009 | Nader et al. | 370/337 |
| 2010/0234014 | A1 * | 9/2010 | Virkki et al. | 455/423 |

FOREIGN PATENT DOCUMENTS

| | | | |
|---|---|---|---|
| GB | 2273424 A * | 6/1994 | |
| WO | 0018164 | 3/2000 | |

* cited by examiner

*Primary Examiner* — Dwayne Bost
*Assistant Examiner* — Nalini Mummalaneni
(74) *Attorney, Agent, or Firm* — Amin, Turocy & Watson, LLP

(57) ABSTRACT

Methods and apparatus that facilitate predictive hard and soft handover are presented herein. A measurement component can measure signal strength data associated with a source cell and one or more target cells. One or more linear regression lines can be computed based on the signal strength data. Rates of at least one of an increase or a decrease in the signal strength data per unit of time can be determined based on a slope of the one or more linear regression lines—the slope can comprise a change in signal strength data per unit of time. A time to trigger at least one of a hard or soft handover can be triggered based on the rates.

23 Claims, 25 Drawing Sheets

PREDICTIVE HARD AND SOFT HANDOVER

TECHNICAL FIELD

This disclosure relates generally to predictive hard and soft handover in a wireless communication infrastructure.

BACKGROUND

Since the advent of wireless cellular technology, the handoff or handover process has been one of the most critical aspects of a wireless network's dropped call performance. Handover relates to transferring a phone call from a source cell to a target cell to avoid terminating or dropping the call, e.g., when an associated mobile device moves away from the source cell. Conventionally, two types of handover exist: hard handover and soft handover. Hard handover utilizes a break-then-make procedure in which a channel of a source cell associated with a call is released before another channel in a target cell is utilized for the call. Soft handover utilizes a make-then-break procedure in which the channel of the source cell is used while the channel of the target cell is used—connection to the target cell is established before breaking the connection to the source cell. Accordingly, soft handover techniques reduce call drop compared to hard handover.

Conventional hard handover technology can reduce call drop by assigning different biases, e.g., offsets, during handover based on different signal quality conditions. For example, wireless providers can set a high handover bias when signal quality and/or conditions are high; otherwise, the wireless providers can set a lower handover bias when signal quality and/or conditions are reduced. However, conventional hard and soft handover techniques do not optimize cell coverage and/or handover reliability because such handovers do not occur during optimal source and target cell signal levels.

For instance, one issue with conventional hard handover technology is that a source cell signal may not successfully complete handover operations when the source cell signal was of low quality before a handover was triggered. For example, handover can be triggered when a mobile device is stationary due to signal fading or degradation. If a low quality source cell signal fades or further degrades proximate to a handover, an associated call can be dropped as a result of failed handover operations. Another issue with conventional hard handover technology is that a source cell signal can fade or further degrade during a time resources of a target cell are allocated to affect a handover—an associated call is dropped when the source cell signal can not support the handover.

One issue with conventional soft handover technology is that a delay during active set additions can result in a dropped call. An active set is a list of target cells that can be utilized during a soft handover, which varies as an associated mobile terminal moves; a target cell can be added to/deleted from the active set based on a location of the mobile terminal relative to a location of the target cell. If a source cell signal fades, or "fast fades," between a time a target cell is selected to be added as an active set addition, but before the active set addition is triggered, a call can drop because of failed decodes associated with poor source cell signal quality.

The above-described deficiencies of today's wireless communication networks and related technologies are merely intended to provide an overview of some of the problems of conventional systems, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter or delineate the scope of the subject innovations. Its sole purpose is to present some concepts of the disclosed subject matter in a simplified form as a prelude to the more detailed description that is presented later.

The subject disclosure relates to methods and apparatus that provide for effective hard and soft handover in a wireless-based communication infrastructure. Conventional handover techniques reduce handover reliability and decrease source and target cell coverage. Compared to conventional techniques, various methods and apparatus described herein facilitate predictive hard and soft handovers that reduce dropped calls and improve wireless customer experiences.

Aspects, features, or advantages of the disclosed subject matter can be exploited in substantially any wireless telecommunication or radio technology, e.g., wireless fidelity (Wi-Fi); Worldwide Interoperability for Microwave Access (WiMAX); Enhanced General Packet Radio Service (Enhanced GPRS); 3GPP Long Term Evolution (LTE); Third Generation Partnership Project 2 (3GPP2); Ultra Mobile Broadband (UMB); 3GPP UMTS; High Speed Packet Access (HSPA); High Speed Downlink Packet Access (HSDPA); High Speed Uplink Packet Access (HSUPA); LTE Advanced (LTE-A), etc.

Additionally, one or more embodiments described herein can include legacy telecommunication technologies, e.g., plain old telephone service (POTS). It is also noted that selections of radio technology include second generation (2G), third generation (3G), and fourth generation (4G) evolution of the radio technology; however, such selections are not intended as a limitation of the disclosed subject matter and related aspects thereof. In addition, the aspects, features, or advantages of the disclosed subject matter can be exploited in disparate electromagnetic frequency bands. Moreover, one or more embodiments described herein can be executed in one or more network elements, such as a mobile device, e.g., user equipment, and/or within one or more elements of a network infrastructure, e.g., radio network controller.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
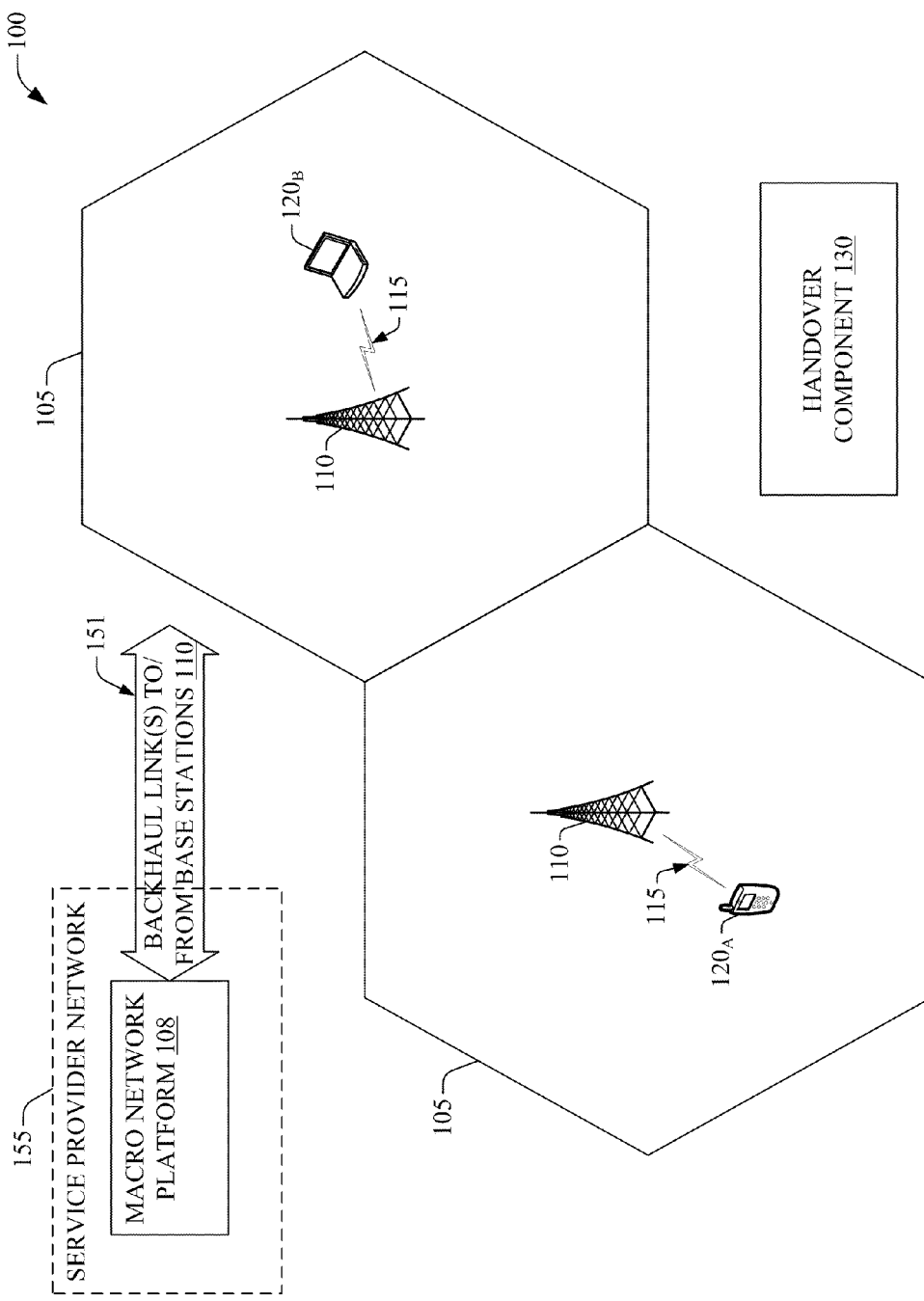
FIG. 1 illustrates a wireless network that includes a handover component for facilitating optimal hard and soft handover, in accordance with an embodiment.

Various non-limiting embodiments of methods and apparatus are provided that facilitate predictive hard and soft handover in a wireless communication infrastructure.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via handover component 210 (described below), to: automatically receive signal strength data from a source cell and at least one target cell; automatically calculate: (1) a change in a rate of reduction of signal power of the source cell, and/or (2) a change in a rate of increase of signal power of the at least one target cell based on the signal strength data; and automatically eliminate or modify a threshold associated with activating an active set addition.

In another example, the artificial intelligence system can be used, via handover component 600 (described below), to automatically receive data associated with a source cell and one or more target cell transmissions; automatically determine a trend in a rate of change of the data per unit of time; automatically predict a time to trigger at least one of a hard or soft handover based on the trend; and automatically initiate the at least one of the hard or soft handover based on the time.

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "local wireless communications site," "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations —unless context warrants particular distinction(s) among the terms. Further, the data and signaling streams can be packetized or frame-based flows.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, that can provide simulated vision, sound recognition, decision making, etc. Also, the terms "local wireless communications site," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to methods and apparatus that provide for optimized hard and soft handover affecting communications via mobile devices. Conventional handover techniques can reduce handoff reliability and decrease cell coverage. Compared to such techniques, various methods and apparatus described herein facilitate predictive hard and soft handover in a wireless network. The wireless network can include a local wireless communications site (or base station), which can use a licensed radio spectrum operated and controlled by a wireless service provider. A mobile device operated by a subscriber within a coverage area typically communicates with a core network via the base station. The mobile device can register with the base station and communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

FIG. 1 illustrates a wireless network 100 that includes a handover component 130 that facilitates optimal hard and soft handover, in accordance with an embodiment. Each macro cell 105 represents a "macro" cell coverage area that is served by a base station 110, e.g., source cell or target cell as described above. It should be appreciated that macro cells 105 are illustrated as hexagons; however, macro cells 105 can adopt other geometries generally dictated by a deployment or topography of the macro cell coverage area, or covered geographic area, e.g., metropolitan statistical area (MSA), rural statistical area (RSA), etc. Macro cell coverage is generally intended to serve mobile wireless devices, e.g., mobile wireless device 120$_A$, mobile wireless device 120$_B$, in outdoor locations. An over-the-air wireless link 115 provides the macro coverage, and wireless link 115 comprises a downlink (DL) and an uplink (UL) (both not shown) that can utilize a predetermined band of radio frequency (RF) spectrum associated with, e.g., Global System for Mobile Communication (GSM), Third Generation Partnership Project (3GPP) Universal Mobile Telecommunication System (UMTS). Accordingly, mobile wireless device 120$_A$ can be a GSM or 3GPP UMTS mobile phone, while 120$_B$ can be a remote computing device with GSM or 3GPP UMTS capabilities.

Base station 110—including associated electronics, circuitry and/or components—and wireless link 115 form a radio network, e.g., base station subsystem (BSS) associated with a Global System for Mobile Communication (GSM) wireless network, or radio access network (RAN) associated with a UMTS wireless network. In addition, base station 110 communicates with macro network platform 108 via backhaul link(s) 151. Macro network platform 108 represents a core network comprising one or more cellular wireless technologies, e.g., 3GPP UMTS or GSM. In one aspect, macro network platform 108 controls a set of base stations 110 that serve either respective cells or a number of sectors within such cells. Macro network platform 108 can also communicate with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 151 can link disparate base stations 110 based on macro network platform 108.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 110 is typically connected to the backhaul network, e.g., service provider network 155, via a broadband modem (not shown) and backhaul link(s) 151. Through backhaul link(s) 151, base station 110 can handle substantially any quality of service (QoS) for heterogeneous packetized traffic, e.g., various multiple packet flows.

Base station 110 can integrate into an existing network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 110; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NSS); via an interface (not shown) between a Serving General Packet Radio Service Support Node (SGSN) and a public data network (PDN) (or Gi interface); via an interface (not shown) between an SGSN and other SGSNs (or Gn interface).

As described above, handover relates to transferring a phone call, or communication, in progress from a source cell to a target cell to avoid terminating or dropping the phone call—the source and target cells equivalent to macro cell 105, for example. Conventionally, two types of handover exist: hard handover and soft handover. Hard handover utilizes a break-then-make procedure in which a channel of a source cell associated with a call is released before another channel in a target cell is utilized for the call. Soft handover utilizes a make-then-break procedure in which the channel of the source cell is used while the channel of the target cell is used—connection to the target cell is established before breaking the connection to the source cell. Handover component 130 can facilitate optimal hard and soft handovers within wireless network 100 by predicting when a source cell signal level will be equal to, or substantially equal to, a target cell signal level, e.g., in a high-mobility environment in which a signal from a source cell is rapidly decreasing as a mobile device moves away from the source cell. Further, handover component 130 can trigger, initiate, and/or cause a hard and/or soft handover to occur when the source cell signal level is predicted to be equal to, or substantially equal to, the target cell signal level. In this way, handover component 130, for example, can avoid pitfalls of conventional handover techniques that cause a hard and/or soft handover to occur when the source cell signal level has faded and/or degraded below the target cell signal level.

It should be appreciated that although handover component 130 is illustrated in FIG. 1 as an entity distinct from base stations 110 and mobile wireless devices $120_A$ and $120_B$, handover component 130 can be located/included within and/or across one or more components, e.g., hardware, software, etc., of system 100, e.g., within or among hardware and/or software of components of radio network 220. For example, in one embodiment, handover component 130 can be located within any component(s) of a GSM and/or UMTS core network, e.g. service provider network 155. In another embodiment, handover component 130 can be located in hardware and/or software of base station 110 and/or mobile devices $120_A$ and $120_B$. Moreover, it should be appreciated that features and advantages of the subject innovation can be implemented in microcells, picocells, femtocells, or the like, wherein base station 110 can be embodied in an access point.

Figure 2:
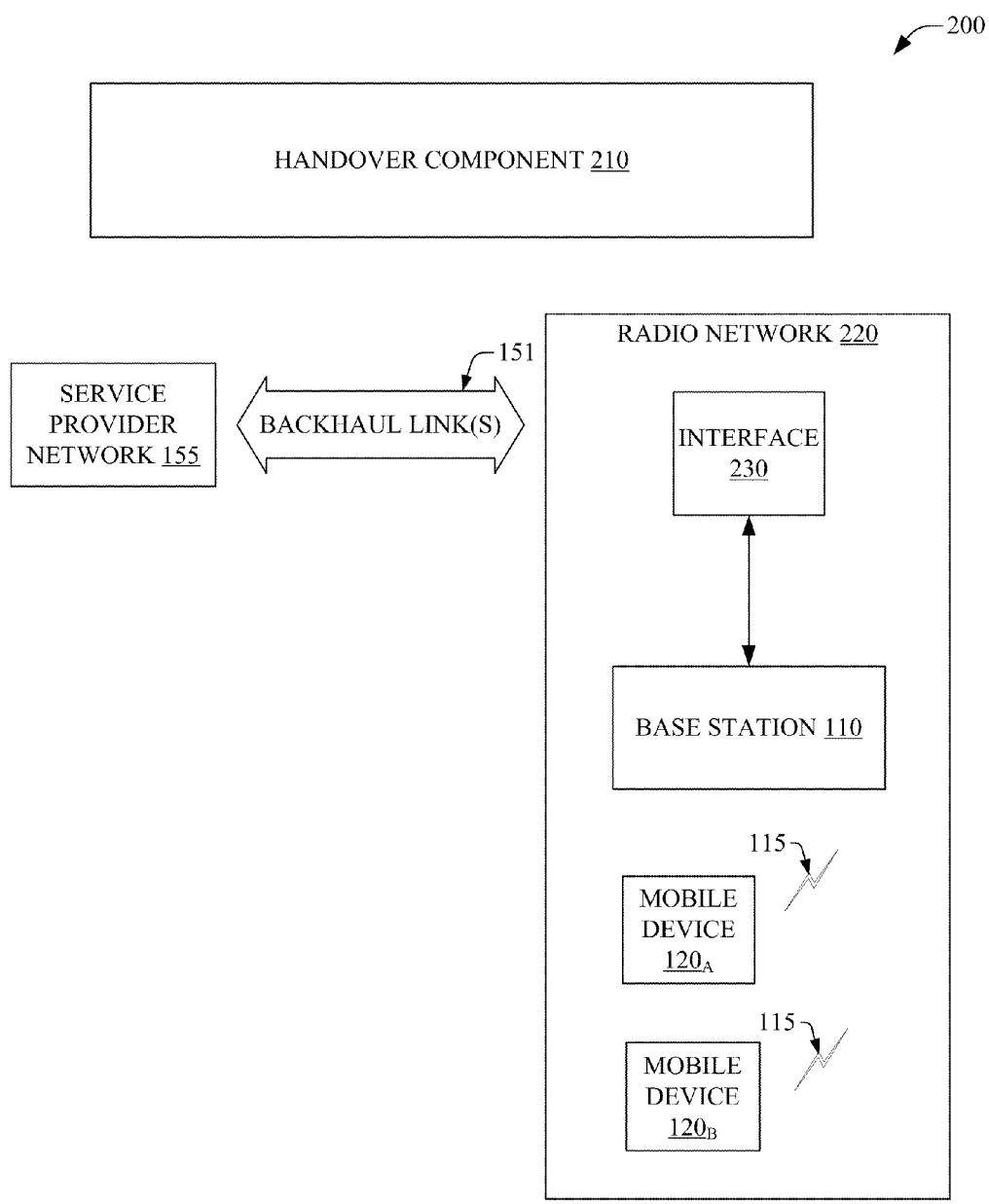
FIG. 2 illustrates a wireless environment that facilitates effective hard and soft handover in a communication infrastructure, in accordance with an embodiment.

FIG. 2 illustrates a demonstrative system 200 that facilitates effective hard and soft handover in a wireless-based communication infrastructure, in accordance with an embodiment. System 200 and the systems described below can comprise one or more base stations 110, for example: coupled to a BSC forming a base station system (BSS) (see, e.g., FIG. 3); coupled to an RNC forming a UMTS Terrestrial Radio Access Network (UTRAN) (see, e.g., FIG. 4). Radio network 220 can couple to a core network, e.g., service provider network 155, via one or more backhaul links 151 (see above) to facilitate wireless communication and data transfer to one or more wireless devices, e.g., mobile device $120_A$, mobile device $120_B$, in accordance with the disclosed subject matter. Radio network 220 can comprise any wireless technology that facilitates hard and/or soft handover, e.g., GSM, UMTS. System 200 includes handover component 210 that can facilitate optimal hard and/or soft handover of communications associated with mobile devices $120_A$ and $120_B$ within any wireless technology supporting hard and/or soft handover, e.g., GSM, 3GPP UMTS.

System 200 and the systems and processes explained below may constitute machine-executable instructions embodied within a machine, e.g., computer, readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

Conventional handover techniques do not optimize cell coverage and/or handover reliability because hard and/or soft handovers may not occur during optimal source cell and/or target cell signal levels, e.g., hard and/or soft handovers may not occur when a source cell signal level is equal to, or substantially equal to, a target cell signal level. For example, conventional hard handover technology can drop a call during a hard handover due to degradation of source cell signals proximate to the hard handover. Further, conventional soft handover technology can drop a call during soft handover due to delay affecting an active set addition. Unlike conventional systems, handover component 210 can increase coverage in areas affected by low source cell signal quality and/or fast fading, and improve handover reliability under low coverage conditions, by facilitating predictive hard and soft handover.

For example, handover component 210 can predict a time when a source cell signal level will be equal to, or substantially equal to, a target cell signal level. In one aspect, handover component 210 can trigger, initiate, and/or cause a hard handover to occur when the source cell signal level is predicted to be equal to, or substantially equal to, the target cell signal level. In another aspect, handover component 210 can trigger, initiate, and/or cause a target cell to be added to an active set associated with a soft handover when the signal level of the target cell is within a predetermined threshold and/or difference, e.g., measured in decibels, from the signal level of the source cell.

It should be appreciated that although handover component 210 is illustrated in FIG. 2 as an entity distinct from other entities and/or components of system 200, handover component 210 can be located/included within one or more components, e.g., hardware, software, etc., of system 200, e.g., mobile devices $120_A$ and/or $120_B$, base station 110, interface 230. Also, it should be appreciated that handover component 210 can be located/included within any component of a GSM and/or UMTS core network, e.g. service provider network 155. Moreover, it should be appreciated that features and advantages of the subject innovation can be implemented in microcells, picocells, femtocells, or the like, wherein base station 110 can be embodied in an access point.

Figure 3:
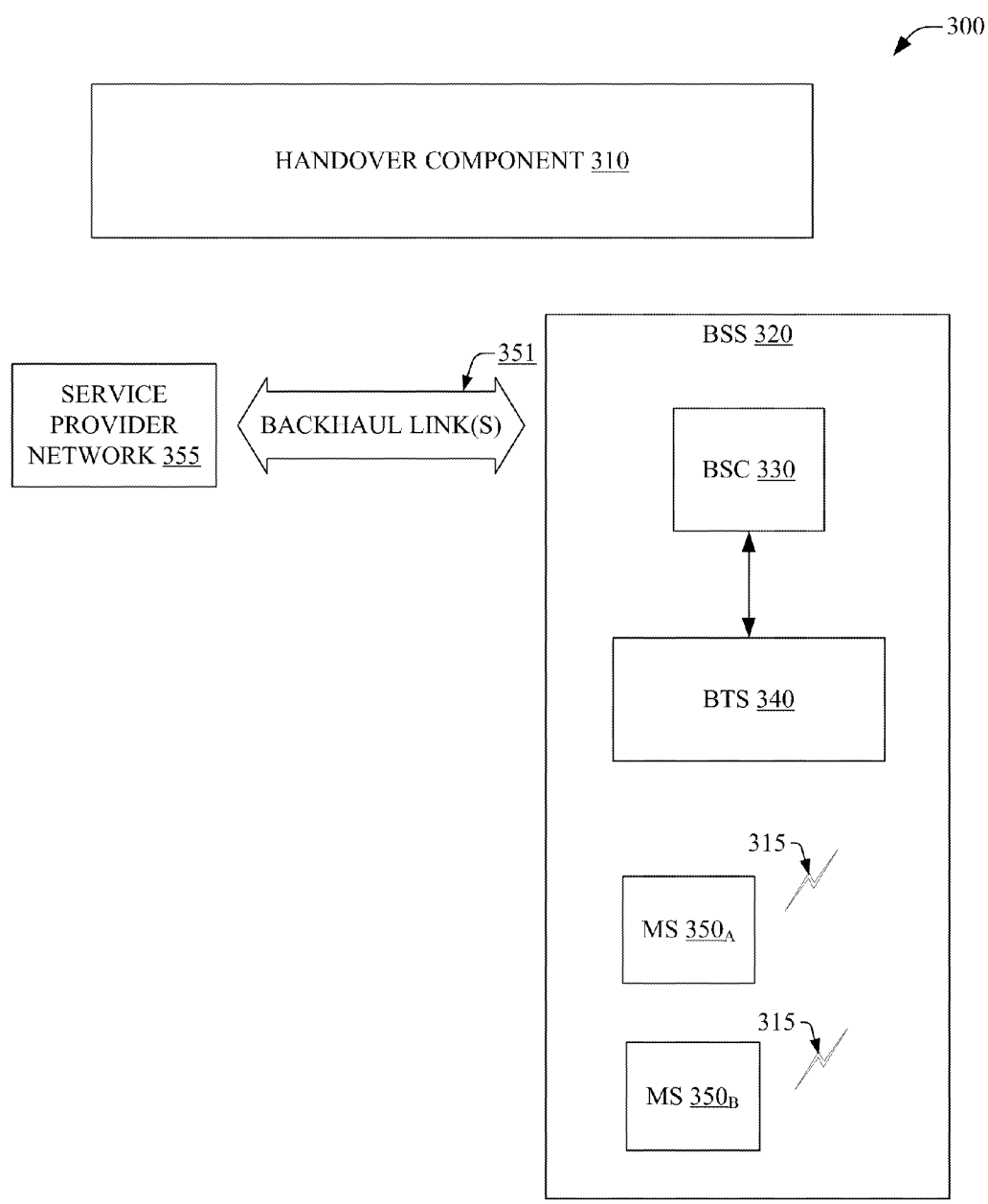
FIG. 3 illustrates another wireless environment that facilitates effective hard and soft handover in a wireless-based communication infrastructure, in accordance with an embodiment.

FIG. 3 illustrates another wireless environment (300) that facilitates effective hard and soft handover in a wireless-based communication infrastructure, in accordance with an embodiment. System 300 can include one or more base transceiver stations 340 coupled to base station controller 330 to form a base station subsystem 320 of a GSM network. Base station subsystem 320 can be coupled to a core network, e.g., service provider network 355, via one or more backhaul links 351 (see above) to facilitate wireless communication and data transfer to one or more wireless devices, e.g., mobile station $350_A$, mobile station $350_B$, in accordance with the disclosed subject matter. Handover component 310 can facilitate optimal hard and/or soft handover within the GSM network.

Figure 4:
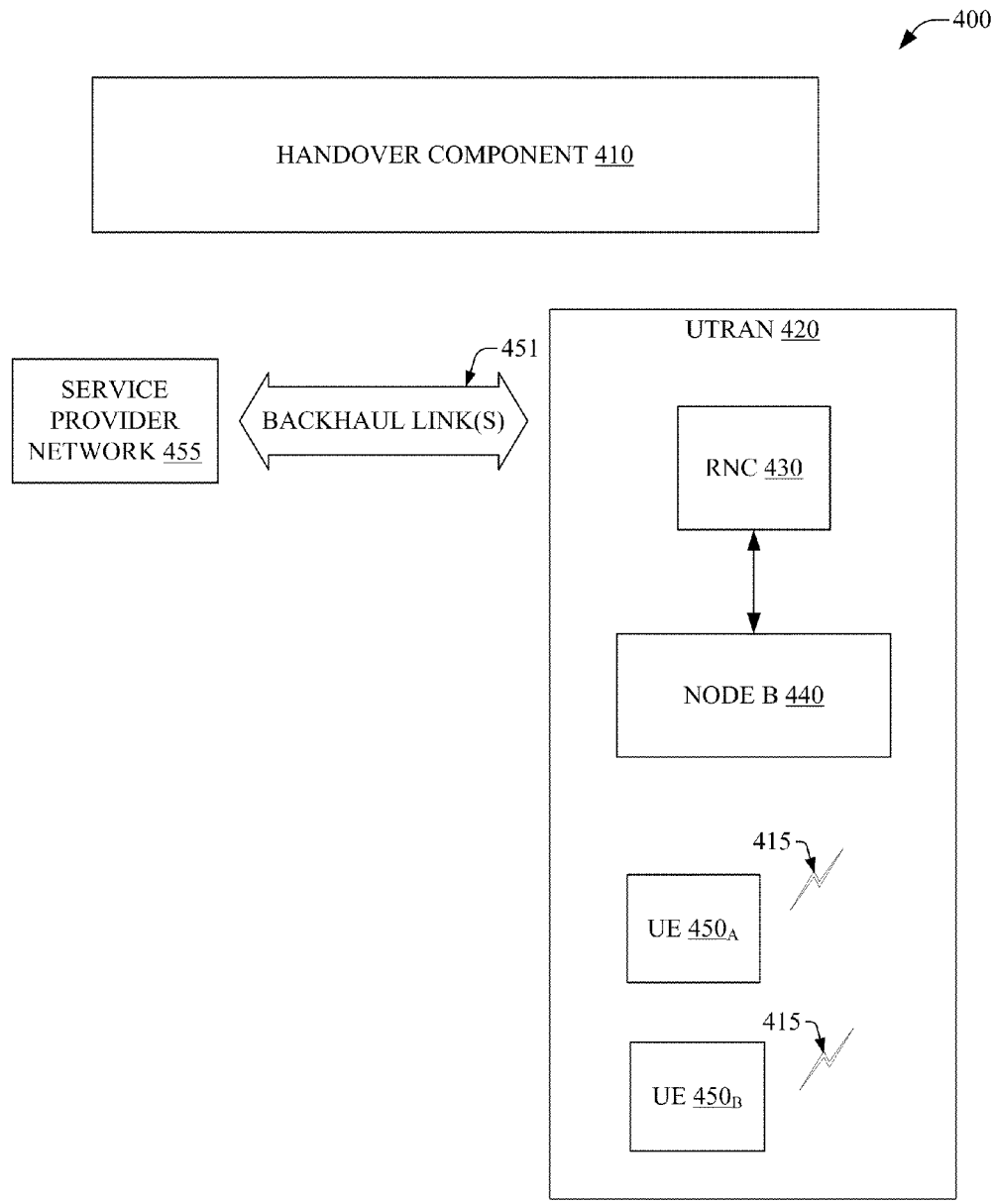
FIG. 4 illustrates yet another wireless environment that facilitates effective hard and soft handover in a wireless-based communication infrastructure, in accordance with an embodiment.

FIG. 4 illustrates yet another wireless environment (400) that facilitates effective hard and soft handover in a wireless-based communication infrastructure, in accordance with an embodiment. System 400 can include at least one Node B 440 coupled to a radio network controller 430 to form a UMTS Terrestrial Radio Access Network (UTRAN) 420 of a UMTS network. UTRAN 420 can couple to a core network, e.g., service provider network 455, via one or more backhaul links 451 (see above) to facilitate wireless communication and data transfer to one or more wireless devices, e.g., user equipment $450_A$, user equipment $450_B$, in accordance with the disclosed subject matter. System 400 includes handover component 410 that can facilitate optimal hard and/or soft handover of communications associated with user equipment $450_A$ and $450_B$ within, e.g., a 3GPP network.

Figure 5:
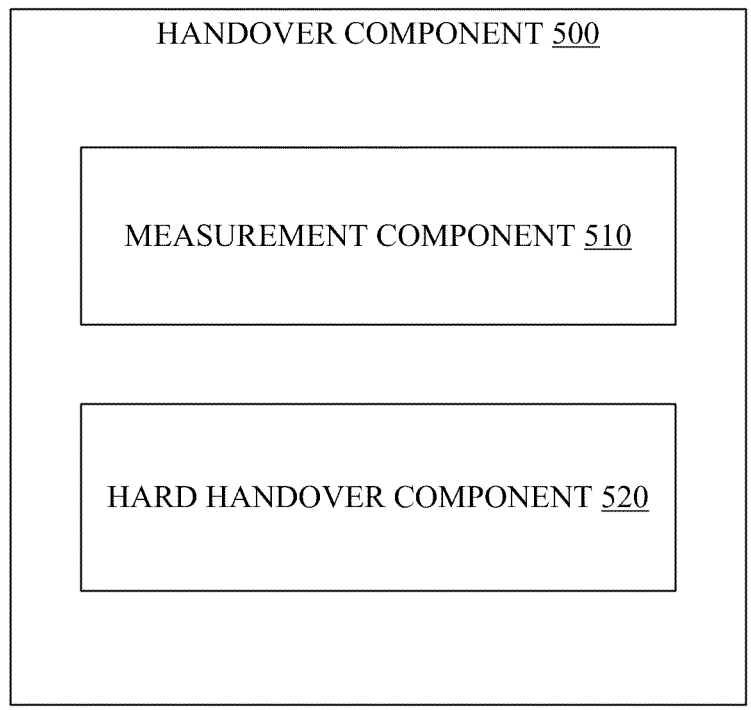
FIG. 5 illustrates a handover component that provides for effective hard handover in a wireless-based communication infrastructure, in accordance with an embodiment.

FIG. 5 illustrates a handover component 500 that provides for effective hard handover in a wireless-based communication infrastructure, in accordance with an embodiment. Handover component 500 includes a measurement component 510 and a hard handover component 520. Measurement component 510 can measure signal strength data associated with a source cell and one or more target cells—the signal strength data corresponding to a physical position of a mobile device relative to physical positions of the source cell and the one or more target cells.

For example, the signal strength data can be measured by at least one of a mobile device, e.g., $120_A$ and $120_B$, a base station, e.g., 110, or any other component of a wireless communication system, e.g., system 200. Such data can reflect the physical position of the mobile device relative to the physical position of the source cell and the physical position of the one or more target cells, e.g., as the mobile device moves away from a source cell and towards one or more target cells. In an aspect, power of uplink and/or downlink signals can be measured and recorded, e.g., in decibel(s), as a function of time. Such data can be recorded, or stored, in any removable/non-removable storage medium, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Further, hard handover component 520 can predict at least one of a predicted time or a predicted signal level based on the signal strength data. It should be appreciated that hard handover component 520 can predict the at least one of the predicted time or the predicted signal level within any element of the wireless communication system. For example, the at least one of the predicted time or the predicted signal level can be predicted by at least one of a mobile device, e.g., $120_A$ and $120_B$, a base station, e.g., 110, or any other component of a wireless communication system, e.g., system 200.

As described above, hard handover utilizes a break-then-make procedure in which a channel of a source cell associated with a communication, e.g., phone call, is released before another channel in a target cell is utilized for the communication. The hard handover transfers a communication associated with the mobile device from the source cell to at least one of the one or more target cells. In one aspect (see below), hard handover component can predict the at least one of the predicted time or the predicted signal level by performing linear regression of uplink and/or downlink power signals associated with the mobile device—such signals can be received from the source cell and one or more target cells and measured and/or recorded as a function of time. For example, a trend of the uplink and/or downlink power signals can be derived based on the linear regression.

In an aspect, hard handover component 520 can identify a time or signal level at which source cell transmission power will be equal to, or substantially equal to, target cell transmission power based on the trend of the uplink and/or downlink power signals. In an aspect, hard handover component 520 can identify the time or signal level based on a predetermined threshold, e.g., bias or offset. For example, if a difference in at least one of a magnitude or power (computed in decibels) of the source and target cell transmission power is less than or equal to the predetermined threshold, e.g., set to be a very small offset or bias, then hard handover component 520 can determine that the source cell transmission power is equal to, or substantially equal to, the target cell transmission power.

In another aspect, hard handover component 520 can utilize linear extrapolation to predict whether a hard handover should be triggered, e.g., prior to the time at which source cell transmission power is predicted to be equal to target cell transmission power. In this way, various aspects of the disclosed subject matter effectively facilitate handover(s) by projecting when source cell transmission power will approximate target cell transmission power. Accordingly, handover component 520 can initiate the hard handover based on, at least in part, the at least one of the time or signal level.

As described above, the signal level can correspond to signal strength data measured by the mobile device and/or component of a wireless communication system, e.g., system 200. In one aspect, hard handover component 520 can initiate, or trigger, the hard handover before the source cell transmission power is projected to be equal to, or substantially equal to, the transmission power of one or more target cells, e.g., to allow for network components to be configured before enabling handover. Accordingly, various aspects of the disclosed subject matter reduce handover drop out, increase wireless coverage, and improve wireless customer experience(s) by initiating handover before source cell signal level degradation can cause handover dropout.

Figure 6:
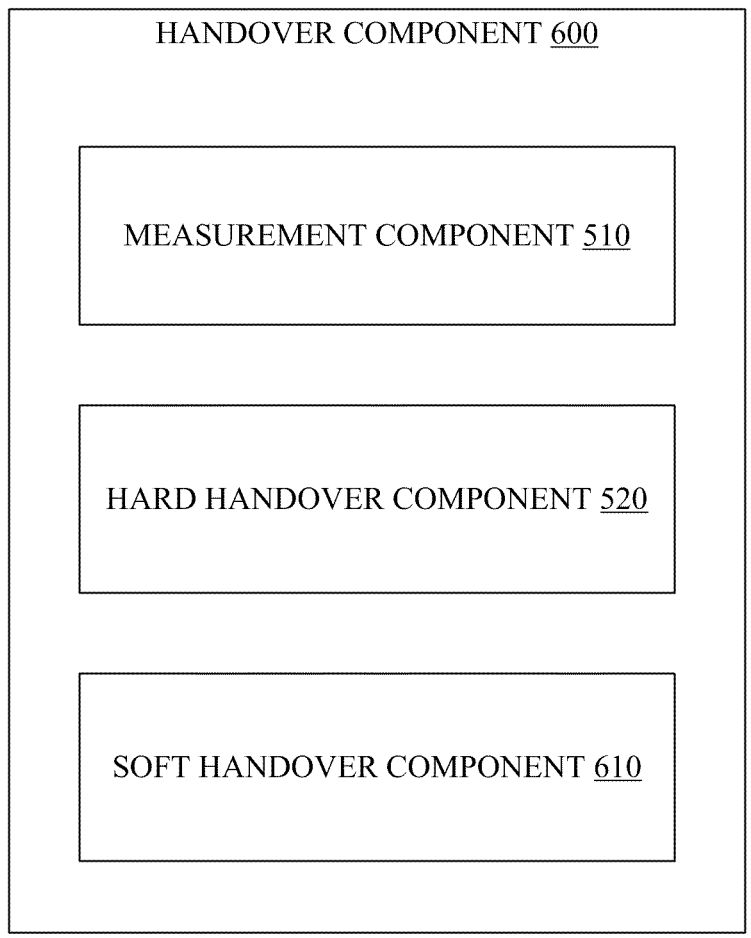
FIG. 6 illustrates a handover component that provides for effective hard and soft handover in a wireless-based communication infrastructure, in accordance with an embodiment.

Now referring to FIG. 6, a handover component 600 that provides for effective hard and soft handover in a wireless-based communication infrastructure is illustrated, in accordance with an embodiment. As described above, soft handover transfers a communication, e.g., phone call, associated with a mobile device from a source cell to a target cell by using a make-then-break procedure, in which a channel of the target cell is used before connection to the source cell is broken. Under soft handover, an active set, or list that identifies target cells, can be used to classify target cells for use during soft handover. Target cells can be added or deleted to/from the active set based on a location of the mobile terminal. When a target cell is identified as a candidate for addition to the active set, a timer is started upon detection of the candidate. When the timer elapses a threshold amount, or time-to-trigger threshold, an active set addition is triggered—the candidate added to the active set.

Under conventional soft handover techniques, if a source cell signal fades, or "fast fades," after a target cell is selected for addition to the active set, but before the active set addition is triggered, a call can drop due to the signal fade. Compared to such techniques, various methods and apparatus described herein can improve active set additions and reduce dropped calls during soft handover by modifying, e.g., changing or removing, a time-to-trigger threshold associated with an active set addition.

In an aspect illustrated by FIG. 6, handover component 600 includes soft handover component 610 that can determine an acceleration in at least one of: (1) a degradation of source cell signal strength data, e.g., fast fade of the source cell, based on measured signal strength data, e.g., data measured by measurement component 510; or (2) an enhancement of target cell signal strength data, e.g., rapid increase in signal quality of a target cell, based on measured signal strength data, e.g., data measured by measurement component 510.

For example, the signal strength data can be measured by at least one of a mobile device, e.g., 120$_A$ and 120$_B$, a base station, e.g., 110, or any other component of a wireless communication system, e.g., system 200. Such data can reflect the location of the mobile device, e.g., as the mobile device moves away from a source cell and towards one or more target cells. In an aspect, power of source and target cell signals can be measured and recorded, e.g., in decibel(s), as a function of time. This data can be recorded, or stored, in any removable/non-removable storage medium, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, the acceleration in degradation of source cell signal strength and/or the acceleration in enhancement of target cell signal strength can be determined, for example, using linear regression of signals received from the source cell and the one or more target cells (and measured and/or recorded over time). Based on the linear regression, soft handover component 610 can determine changes in a rate of degradation (or acceleration in degradation) of source cell signal strength per unit of time, and/or determine changes in a rate of enhancement (or acceleration in enhancement) of target cell signal strength per unit of time.

Further, soft handover component 610 can modify or remove a time-to-trigger threshold associated with adding at least a subset of the one or more target cells to an active set, e.g., associated with adding one or more target cells to the active set; associated with adding the total number of target cells to the active set. In an aspect, soft handover component 610 can modify or remove the time-to trigger threshold associated with an active set addition, based on the acceleration. In this way, various aspects of the disclosed subject matter reduce soft handover drop out, provide protection from fast fades, and improve wireless customer experience(s) by initiating active set addition(s) before source cell signal level degradation can cause soft handover dropout.

Figure 7:
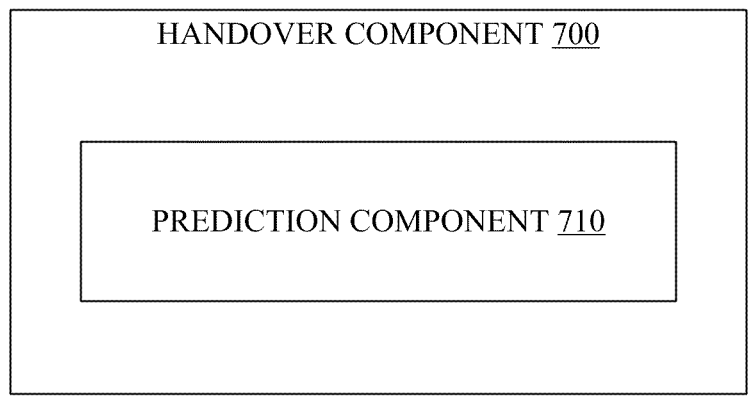
FIG. 7 illustrates a handover component that includes a prediction component, in accordance with an embodiment.

Referring now to FIG. 7, a handover component 700 that includes a prediction component 710 is illustrated, in accordance with an embodiment. Prediction component 710 can determine a rate of at least one of an increase or a decrease in the signal strength data of at least one of the source cell or the one or more target cells per unit of time. Further, hard handover component 610 can predict the at least one of the time or signal level based on the rate. In an aspect illustrated by FIG. 8, prediction component 800 can include regression component 810 that can determine the rate of the at least one of the increase or decrease in the signal strength data as a function of a slope of one or more linear regression lines, the slope representing a change in signal strength data over time.

Figure 8:
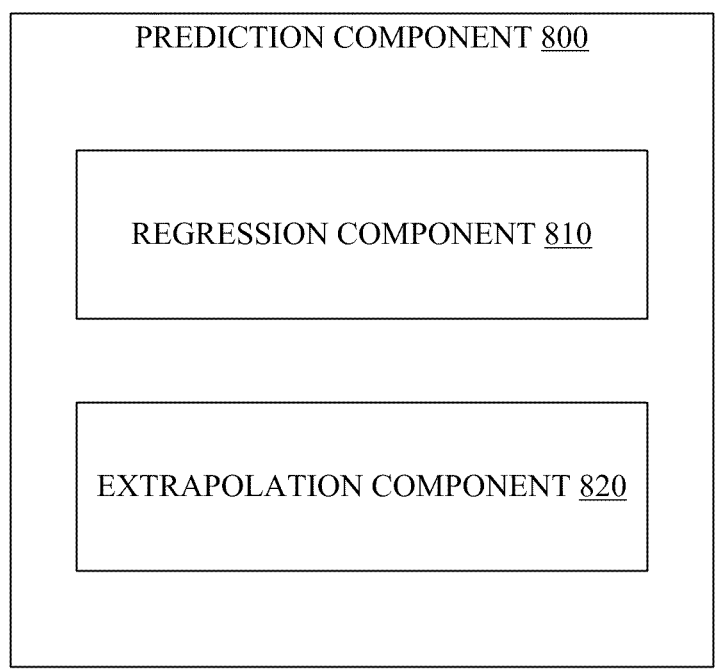
FIG. 8 illustrates a prediction component, in accordance with an embodiment.

In the embodiment illustrated by FIG. 8, prediction component 800 can further include extrapolation component 820 that can predict signal strength of the source cell and the one or more target cells based on the rate. Moreover, extrapolation component 820 can determine a projected time when the predicted signal strength of the source cell will be equal to, or substantially equal to, the predicted signal strength of the one or more target cells. Hard handover component 610 can initiate the hard handover based on, at least in part, the projected time. In an aspect, hard handover component 610 can initiate the hard handover before the projected time, e.g., to account for time required for a BSS to request an MSC to secure a channel on a target cell within a GSM wireless network. Accordingly, a handover command can be issued from the target cell to an affected mobile device at the time when the predicted signal strength of the source cell is equal to, or substantially equal to, the predicted signal strength of the one or more target cells.

In an aspect, extrapolation component 820 can determine whether an absolute magnitude of a difference in signal strength rates of a source cell and target cell is equal to or greater than a predetermined combined rate threshold. Further, extrapolation component 820 can determine whether the projected time is substantially equal to or less than a predetermined period of time. For example, if the source cell signal strength degrades at a rate of 10 dB/sec, and the target cell, e.g., neighbor cell, signal strength improves, e.g., enhances, at a rate of 8 dB/sec, then a combined slope trend, or an absolute magnitude of a difference in signal strength rates of the source cell and the target cell is 18 dB/sec. If it is determined that this combined slope trend is equal to or greater than the predetermined combined rate threshold, e.g., of 15 dB/sec; and the (1) projected time or (2) another time when the signal strength of the source cell is projected to be a predetermined difference from the predicted signal strength of the one or more target cells are substantially equal to or less than the predetermined period of time, then hard handover can be triggered, e.g., initiated, by hard handover component 610.

Figure 9:
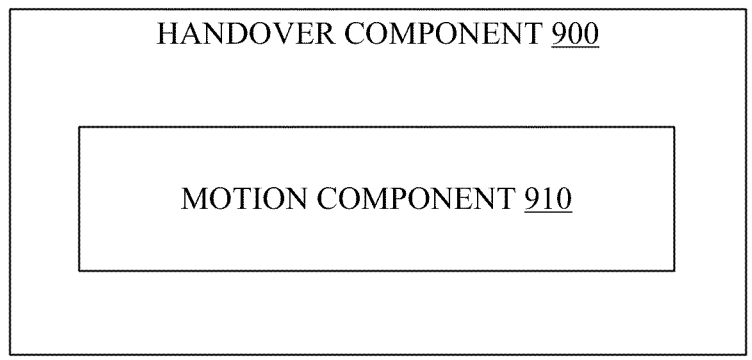
FIG. 9 illustrates a handover component that includes a motion component, in accordance with an embodiment.

FIG. 9 illustrates a handover component 900, in accordance with an embodiment. An issue with conventional hard handover technology is that a source cell signal may not successfully complete handover operations when the source cell signal was of low quality before a handover was triggered. For example, handover can be triggered when a mobile device is stationary due to signal fading or degradation. If a low quality source cell signal fades or further degrades proximate to a handover, an associated call can be dropped as a result of failed handover operations.

Further, signal fading or degradation of control and/or command signals/messages used during conventional hard and soft handover technique(s) can cause handover failure because error correction techniques applied to the control and/or the command signals/messages are less robust than error correction techniques applied to user speech/packet data. To address these and other concerns of conventional handover technology, handover component 900 can include a motion component 910 that can determine movement of a mobile device. Hard handover component 900 can initiate a soft and/or hard handover based on, at least in part, the determined movement. In one aspect, motion component 910 can determine whether the mobile device is stationary; and handover component 900 can restrict handover when the mobile device is stationary.

For example, handover component 900 can determine whether a combined slope, or rate, of a source cell signal strength rate and a target cell signal strength rate meets and/or exceeds a predetermined threshold. If the combined slope exceeds the predetermined threshold, and motion component 910 determines the mobile device is stationary, handover component 900 can avoid a hard handover to facilitate maintaining a call on the source cell. In another embodiment, handover component 900 can avoid a soft handover, or active set addition, when the combined slope exceeds the predetermined threshold and the mobile device is stationary. In this way, various aspects of the disclosed subject matter can prevent dropout when a mobile device is stationary.

Figure 10:
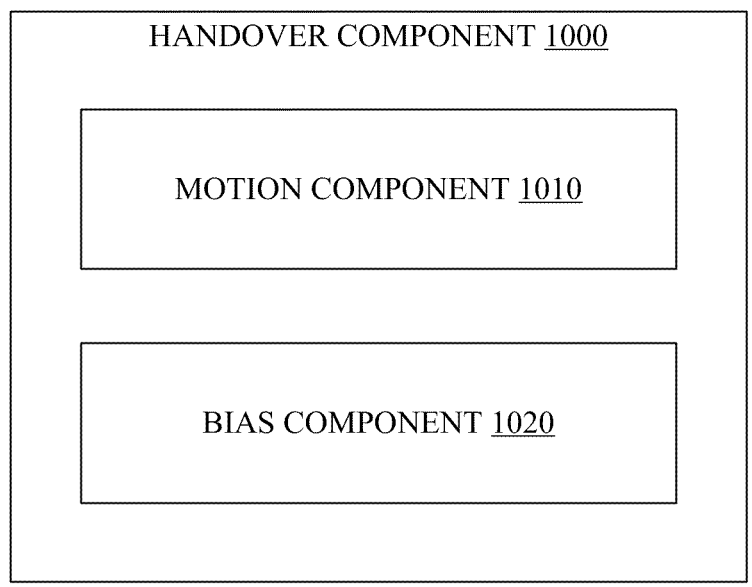
FIG. 10 illustrates a handover component that includes a bias component, in accordance with an embodiment.

Now referring to FIG. 10, another handover component (1000) is illustrated, in accordance with an embodiment. Handover component 1000 can include a bias component 1020 that can assign a restrictive bias, e.g., offset, to at least part of the signal strength data. Accordingly, handover component 1000 can restrict handover based on, at least in part, the restrictive bias, e.g., by utilizing the offset when predicting at least one of a time or signal level based on the signal strength data. In an aspect, bias component 1020 can assign a small bias to at least part of the signal strength data when the mobile device moves. Handover component 1000 can initiate a soft and/or hard handover based on, at least in part, the small bias, e.g., by utilizing the offset when predicting at least one of a time or signal level based on the signal strength data.

Figure 11:
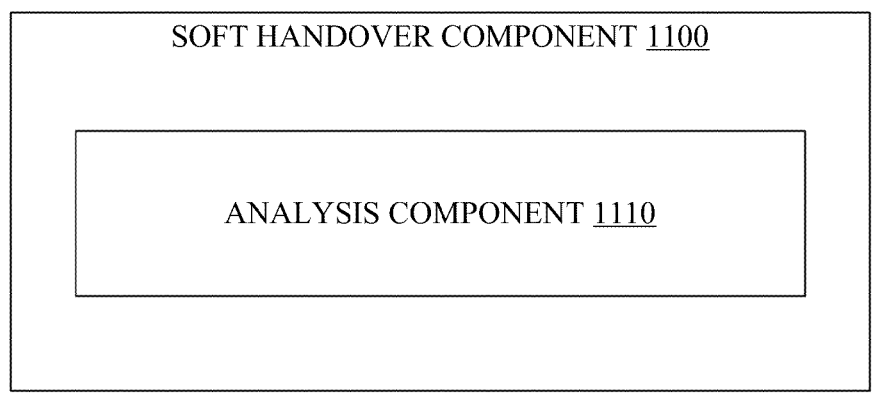
FIG. 11 illustrates a soft handover component, in accordance with an embodiment.

FIG. 11 illustrates a soft handover component 1100, in accordance with an embodiment. As described above, an active set, or list that identifies target cells, can be used during soft handover to classify target cells as candidates for soft handover. The target cells can be added or deleted to/from the active set based on a physical position of a mobile device relative to the physical position of a source cell and the physical position of one or more target cells. When a target cell is identified as a candidate for addition to the active set, a timer is started upon detection of the target cell. When the timer value elapses a time-to-trigger threshold, an active set addition is triggered—the target cell candidate is added to the active set. Under conventional soft handover techniques, if a source cell signal fades, or "fast fades," after a target cell is selected for addition to the active set, but before the active set addition is triggered, a call can drop due to source cell signal fade.

To address these and other concerns of conventional soft handover technology, soft handover component 1100 can include an analysis component 1110 that can facilitate replacing a selection of a time-to-trigger threshold with a predictive analysis of one or more trends associated with a rate of at least one of an increase or a decrease in source and target cell signal strength data over time. In an aspect, analysis component 1110 can predict a time to initiate a soft handover based on the rate. Further, analysis component 1110 can determine whether the time is within a time-to-trigger threshold. Moreover, analysis component 1110 can reduce the time-to-trigger threshold when the time is within the time-to-trigger threshold. In this way, soft handover component 1100 can improve active set additions and reduce dropped calls during soft handover by changing or removing a time-to-trigger threshold associated with an active set addition.

Figure 12:
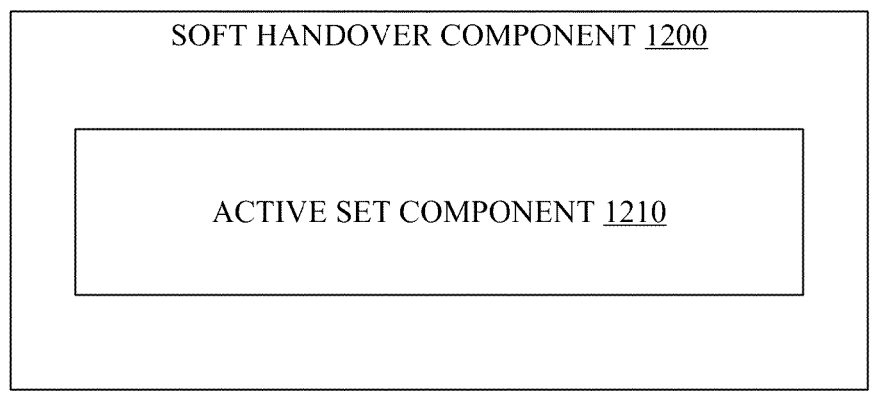
FIG. 12 illustrates another soft handover component, in accordance with an embodiment.

An amount of time can be required for wireless network components, e.g., an RNC, to allocate and communicate resources in a target cell to account for an active set addition. Accordingly, in an aspect, analysis component 1110 can reduce the time-to-trigger threshold by at least an amount of time associated with allocating resources to affect adding the one of the one or more target cells to the active set. In another aspect, a soft handover component 1200 can include active set component 1210, in accordance with an embodiment illustrated by FIG. 12. Active set component 1210 can remove target cells from the active set based on the rate. For example, active set component 1210 can remove target cells from the active set based on a rate of an increase or a decrease in target cell signal strength data. In another example, active set component 1210 can remove target cells from the active set based on whether a combined slope, or rate, of a source cell signal strength rate and a target cell signal strength rate meets and/or exceeds a predetermined threshold.

Figure 13:
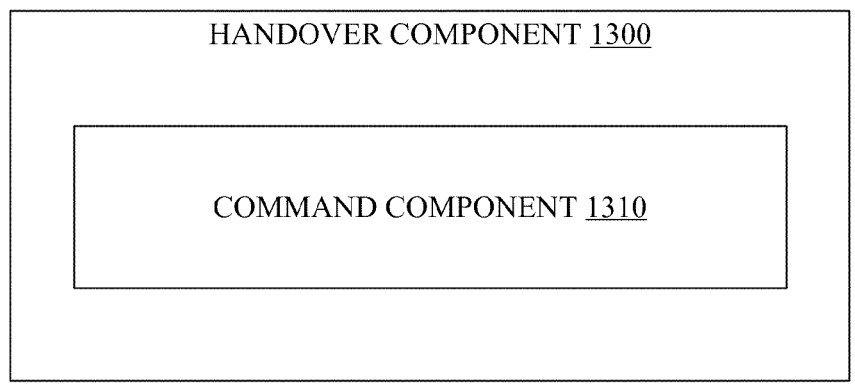
FIG. 13 illustrates yet another handover component, in accordance with an embodiment.
Figure 14:
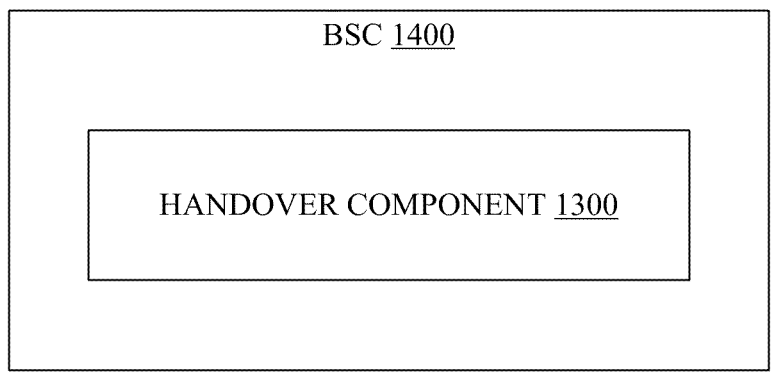
FIG. 14 illustrates a base station controller, in accordance with an embodiment.

FIG. 13 illustrates yet another handover component (1300), in accordance with an embodiment. Handover component 1300 can include command component 1310 that can modify at least one of a component or resource associated with at least one of the hard or soft handover. For example, in an aspect illustrated by FIG. 14, base station controller 1400 of a GSM wireless network can include handover component 1300 and associated command component 1310. In an aspect, command component 1310 can modify one or more component, e.g., hardware and/or software, resources of base station controller 1400, e.g., generate hard handover commands to one or more associated base transceiver stations for managing predictive hard handover in accordance with aspects associated with handover component 500 described above.

Figure 15:
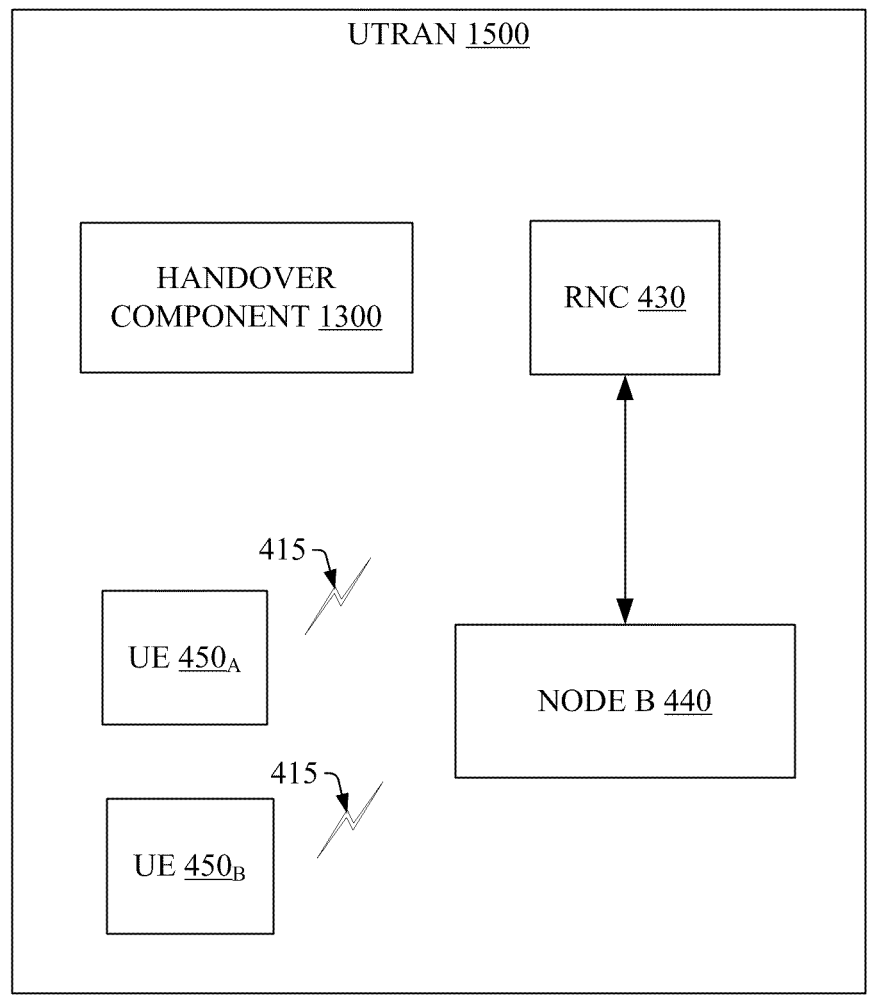
FIG. 15 illustrates a mobile device, in accordance with an embodiment.

In another aspect illustrated by FIG. 15, UTRAN 1500 of a UMTS wireless network can include handover component 1300 and associated command component 1310 (not shown). In one aspect, command component 1310 can modify one or more component resources, e.g., hardware and/or software, within UTRAN 1500, e.g., via soft handover commands that manage predictive soft handover in accordance with aspects associated with handover component 600 described above. It should be appreciated that although handover component 1300 is illustrated in FIG. 15 as an entity distinct from other entities and/or components of UTRAN 1500, handover component 1300 can be located/included within one or more components/elements, e.g., hardware, software, etc., of UTRAN 1500, e.g., user equipment $450_A$ and/or $450_B$, node B 440, RNC 430.

FIGS. 16-20 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 16:
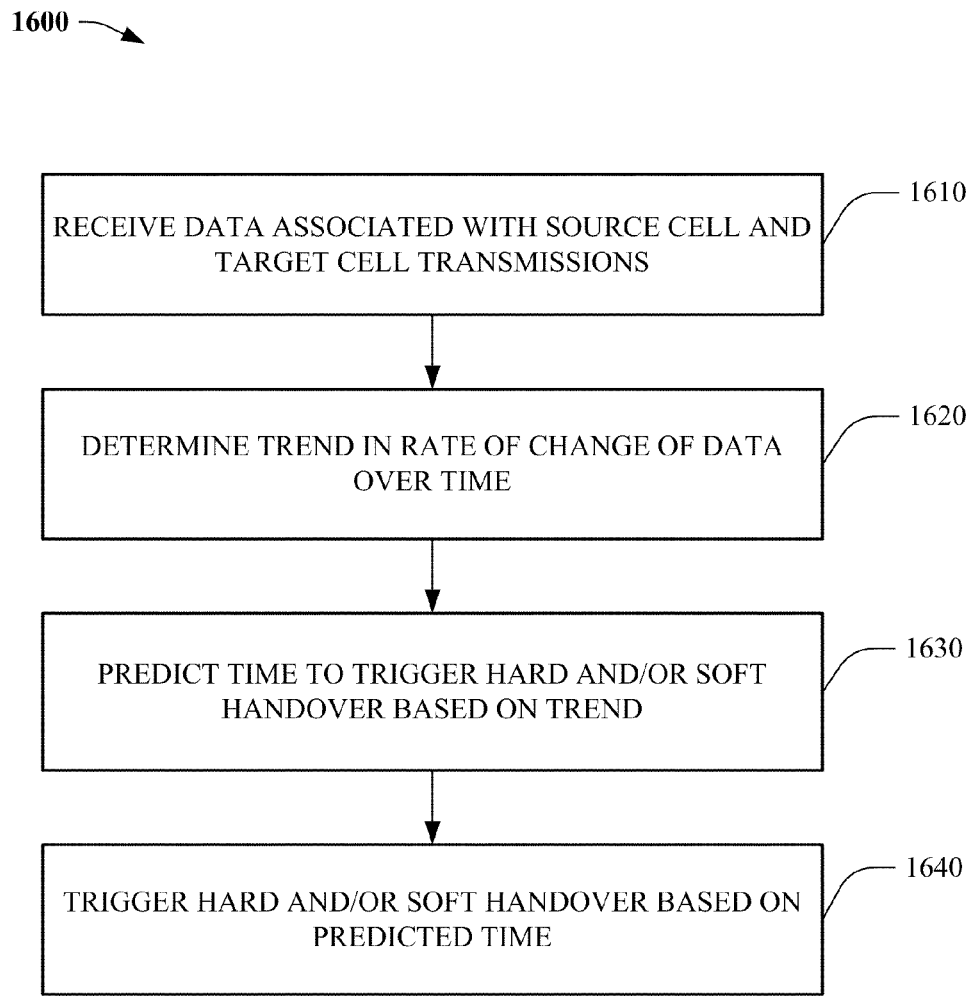
FIG. 16 illustrates a process that provides for effective handover in a wireless-based communication infrastructure, in accordance with an embodiment.
Figure 17:
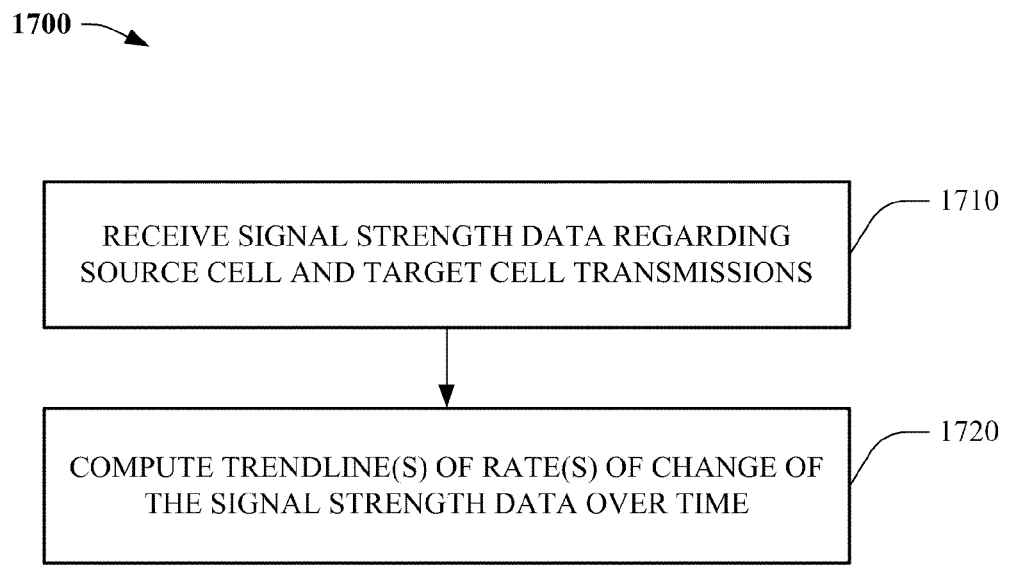
FIG. 17 illustrates another process that provides for effective handover in a wireless-based communication infrastructure, in accordance with an embodiment.

Referring now to FIGS. 16 and 17, processes 1600 and 1700, respectively, for facilitating effective handover in wireless-based communication infrastructure(s) are illustrated, in accordance with an embodiment. At 1610, data associated with source and target cell transmissions can be received. In an aspect (at 1710), the data can relate to signal strength associated with source and target cell transmissions. For example, the data can include computed power levels of signals received from the source and target cell(s). A trend, or slope, in rate of change of computed signal strength data of the source and target cell(s) over time can be determined at 1620. In one aspect (at 1720), trend lines, e.g., linear regression lines, of rates of change of the signal strength data per unit of time can be computed. For example, the trend lines can relate to a rate of degradation of source cell signal strength and/or a rate of enhancement of target cell signal strength over time. At 1630, a time to trigger a hard and/or soft handover can be predicted based on the trend(s) determined at 1620 (or 1720). The hard and/or soft handover can be triggered at 1640 based on the time predicted at 1630.

Figure 18:
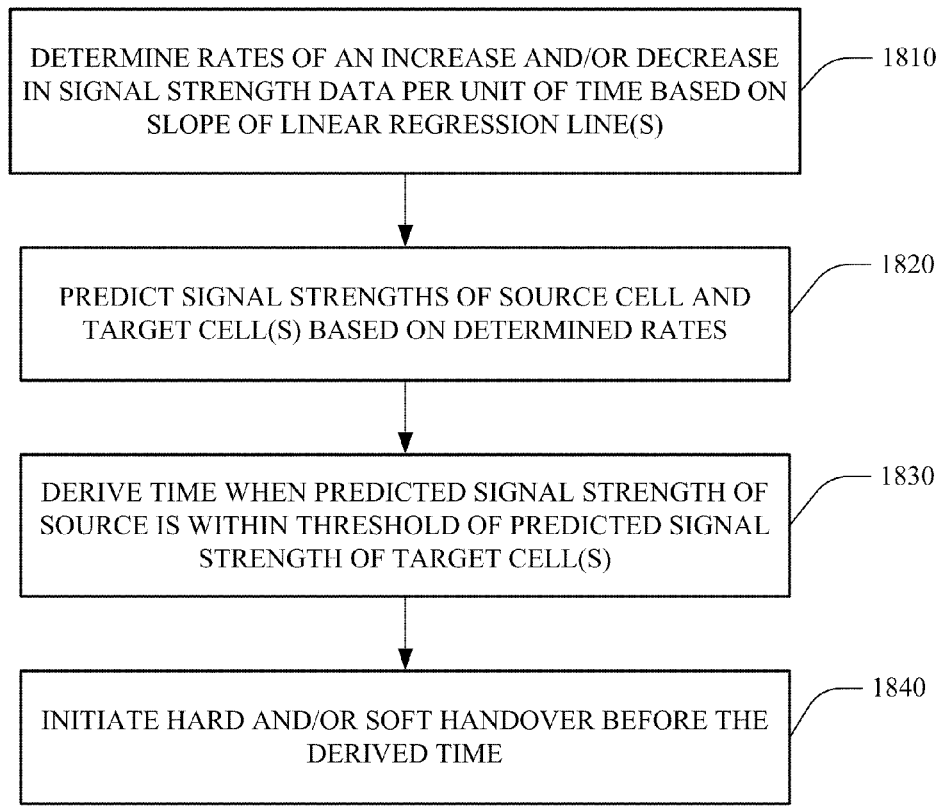
FIG. 18 illustrates yet another process that provides for effective handover in a wireless-based communication infrastructure, in accordance with an embodiment.
Figure 19:
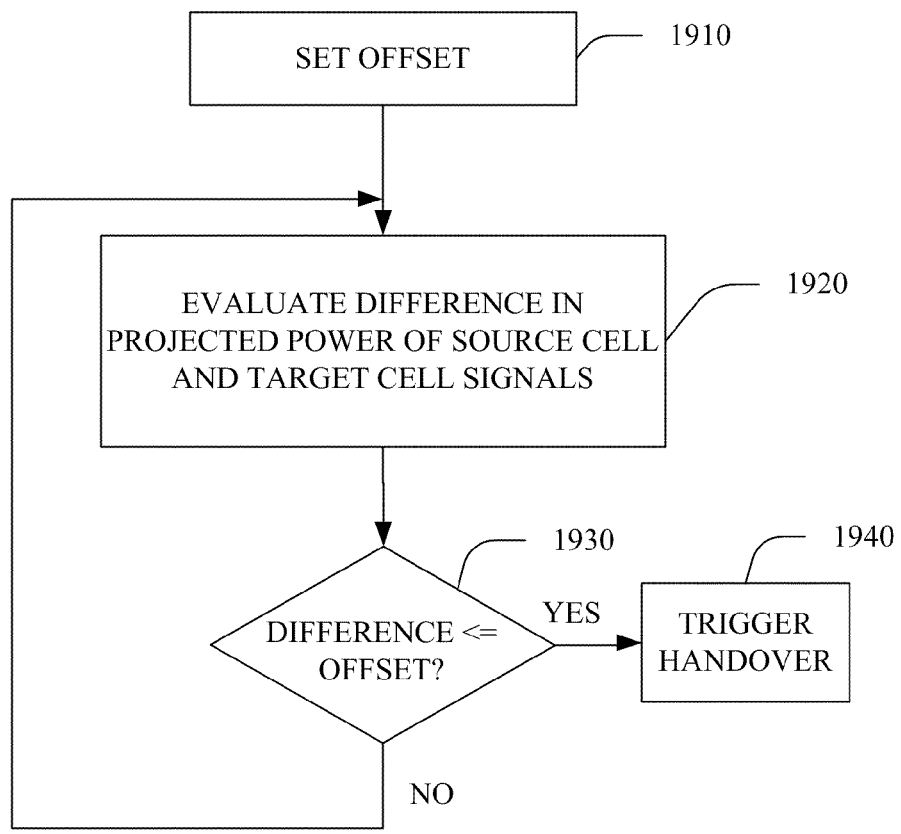
FIG. 19 illustrates a process for triggering a handover, in accordance with an embodiment.

FIGS. 18 and 19 illustrate processes 1800 and 1900, respectively, for facilitating effective handover in a wireless-based communication infrastructure, in accordance with an embodiment. At 1810, rates of an increase and/or a decrease in signal strength data per unit of time, e.g., acceleration of signal strength change, can be determined based on one or more slopes of the one or more trend lines (or linear regression lines) computed, e.g., at 1720 (see FIG. 17). Signal strengths of the source cell and target cell(s) can be predicted at 1820 based on the rates determined at 1810. At 1830, a time when the predicted signal strength of the source cell is within a predetermined threshold of the predicted signal strength of the target cell(s) can be derived as a function of the predicted signal strengths.

For example, referring now to FIG. 19, the predetermined threshold, or offset, can be determined, or set, at 1910—the offset can be added to and/or considered in calculated results, e.g., results related to a computed difference in signal power between source and target signals, to allow for measurement and/or computing error(s). A difference in predicted strengths of the source and target cell(s) can be computed at 1920. At 1930, it can be determined whether the computed difference is less than and/or equal to the offset. Flow continues to 1920 if it is determined that the computed difference is greater than the offset; otherwise, flow continues to 1940, at which handover can be triggered. Referring now to an aspect illustrated by FIG. 18, hard and/or soft handover can be triggered before the time determined at 1830, e.g., to allow for configuration of hardware and/or software before triggering the hard and/or soft handover.

Figure 20:
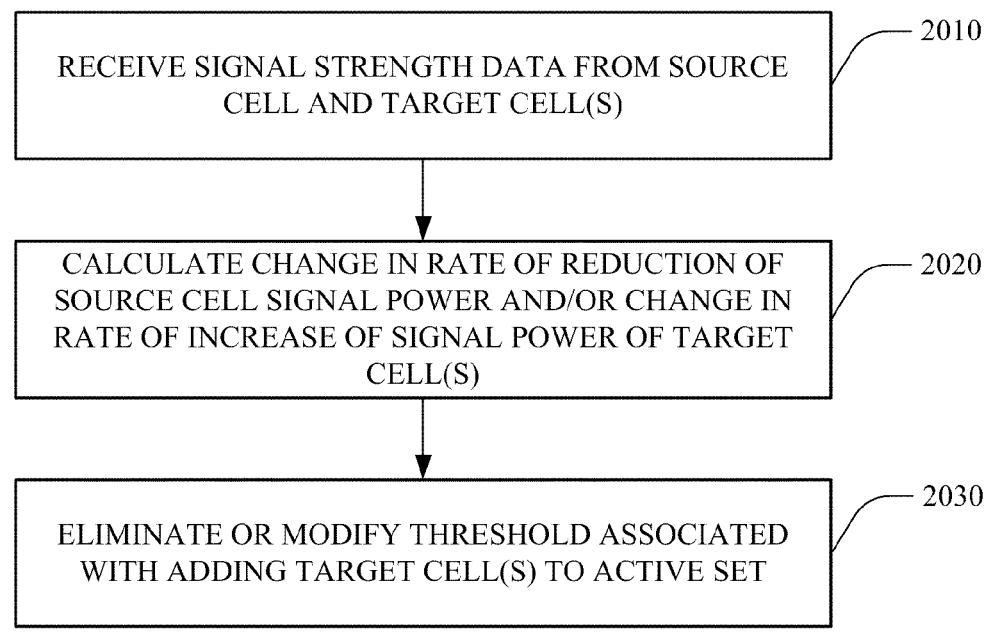
FIG. 20 illustrates a process for modifying a threshold associated with active set additions, in accordance with an embodiment.

FIG. 20 illustrates a process 2000 for modifying a threshold associated with active set additions, in accordance with an embodiment. At 2010, data associated with signal strength of a source cell and one or more target cells can be received. A change in a rate of reduction of signal power of the source cell, a change in a rate of increase of signal power of the one or more target cells, or whether a combined slope, or rate, of a source cell signal strength rate and a target cell signal strength rate meets and/or exceeds a predetermined threshold can be calculated at 2020, e.g., utilizing regression analysis and/or trend lines as described above.

Conventional soft handover techniques can lead to dropped calls when a source cell signal fades after a target cell is selected for addition to the active set, but before the active set addition is triggered. To address this and other concerns of conventional soft handover technology, a threshold associated with activating an active set addition, e.g., a time-to-trigger threshold, can be eliminated or modified at 2030. In an aspect, the time-to-trigger threshold can be reduced by at least an amount of time associated with allocating resources to affect adding the one of the one or more target cells to the active set. In another aspect, activating the trigger by a time-to-trigger threshold can be replaced by predicting a time to initiate a handover based on a change in the rate of decrease in signal power of the source cell, and a change in the rate of increase of signal power of the one or more target cells determined at 2020.

Figure 21:
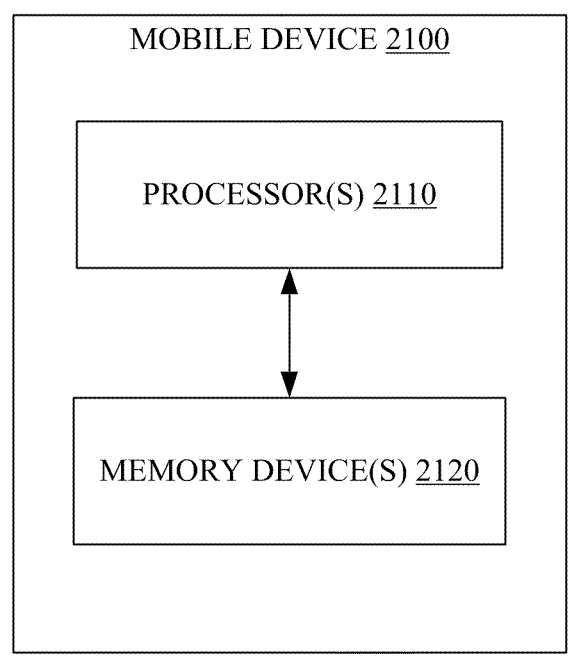
FIG. 21 illustrates a block diagram of a mobile device, in accordance with an embodiment.

FIG. 21 illustrates a block diagram of a mobile device 2100, in accordance with an embodiment. Mobile device 2100 can perform the acts described above related to, e.g., mobile devices $120_A$ and $120_B$; mobile stations $350_A$ and $350_B$; user equipment $450_A$ and $450_B$. For example, mobile device 2100 can perform acts, via processor(s) 2100, described with respect to FIGS. 16-20 and soft handover components 610, 1100, and 1200. In an aspect, mobile device 2100 can determine a rate of change (1) in a degradation of source cell signal strength data based on measured signal strength data; and/or (2) in an enhancement of target cell signal strength data based on the measured signal strength data. Further, mobile device 2100 can modify or remove a time-to-trigger threshold associated with adding one of the one or more target cells to an active set based on the rate of change. Processors(s) 2110 can perform such acts within the mobile device utilizing, e.g., memory device(s) 2120.

Figure 22:
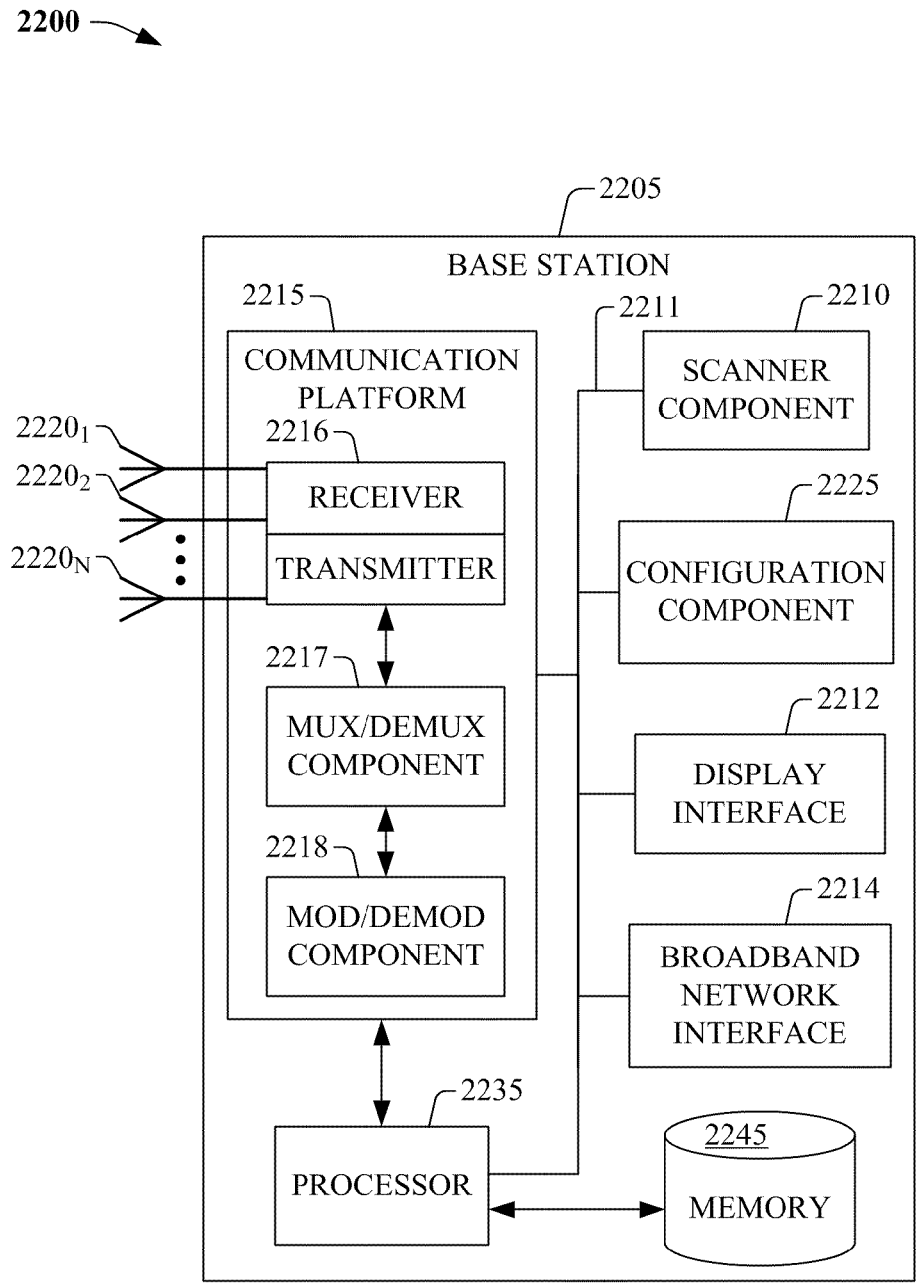
FIG. 22 illustrates a block diagram of a base station, in accordance with an embodiment.
Figure 23:
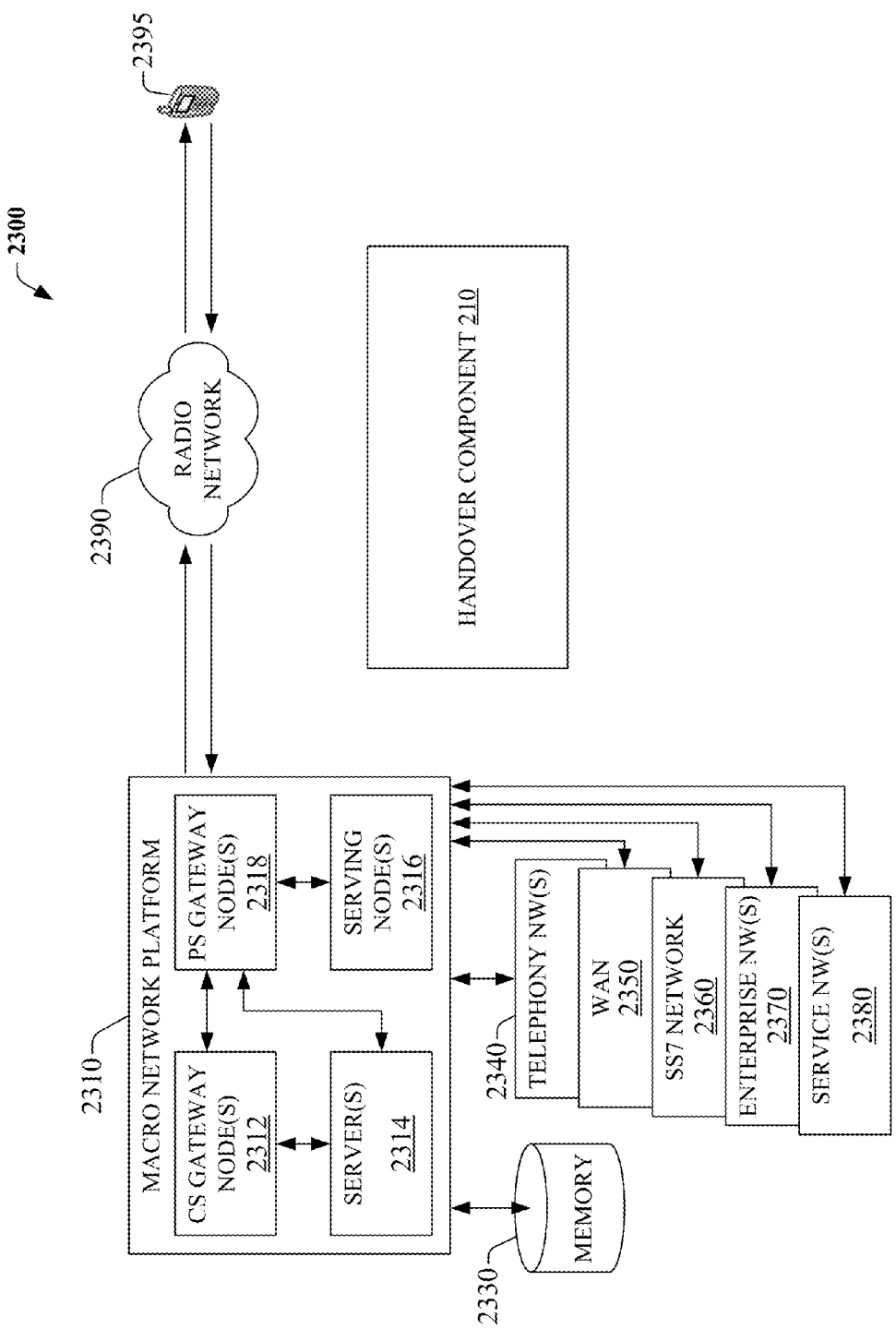
FIG. 23 illustrates a block diagram of a wireless network environment, in accordance with an embodiment.

To provide further context for various aspects of the disclosed subject matter, FIGS. 22 and 23 illustrate, respectively, a block diagram of an embodiment 2200 of a base station 2205 that can enable or exploit features or aspects of the disclosed subject matter; and a wireless network environment 2300 that includes a macro network platform 2310, radio network 2390, and handover component 210 that exploit aspects of the subject innovation in accordance with various aspects of the subject specification. In embodiment 2200, base station 2205 can receive and transmit signal(s) from and to wireless devices, e.g., wireless ports and routers, or the like, through a set of antennas $2220_1$-$2220_N$ (N is a positive integer). Antennas $2220_1$-$2220_N$ are a part of communication platform 2215, which comprises electronic components and associated circuitry that provides for processing and manipulation of received signal(s) and signal(s) to be transmitted.

In an aspect, communication platform 2215 includes a receiver/transmitter 2216 that can convert analog signals to digital signals upon reception of the analog signals, and convert digital signals to analog signals upon transmission. In addition, receiver/transmitter 2216 can divide a single data stream into multiple, parallel data streams, or perform the reciprocal operation. Coupled to receiver/transmitter 2216 is a multiplexer/demultiplexer 2217 that facilitates manipulation of signal in time and frequency space. Electronic component 2217 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2217 can scramble and spread information (e.g., codes) according to substantially any code known in the art, e.g., Hadamard-Walsh codes, Baker codes, Kasami codes, polyphase codes, etc. A modulator/demodulator 2218 is also a part of communication platform 2215, and can modulate information according to multiple modulation techniques, such as frequency modulation, amplitude modulation, e.g., M-ary quadrature amplitude modulation (QAM), with M a positive integer), phase-shift keying (PSK), etc.

Base station 2205 also includes a processor 2235 configured to confer, at least in part, functionality to substantially any electronic component in base station 2205. In particular, processor 2235 can facilitate configuration of base station 2205 via handover component 210, and one or more component therein. Additionally, base station 2205 includes display interface 2212, which can display functions that control functionality of base station 2205, or reveal operation conditions thereof. In addition, display interface 2212 can include a screen to convey information to an end user. In an aspect, display interface 2212 can be a liquid crystal display (LCD), a plasma panel, a monolithic thin-film based electrochromic display, and so on. Moreover, display interface can also include a component (e.g., speaker) that facilitates communication of aural indicia, which can also be employed in connection with messages that convey operational instructions to an end user. Display interface 2212 also facilitates data entry e.g., through a linked keypad or via touch gestures, which can cause base station 2205 to receive external commands, e.g., restart operation.

Broadband network interface 2214 facilitates connection of base station 2205 to service provider network 155 via backhaul link(s) 151 (not shown in FIG. 22), which enables incoming and outgoing data flow. Broadband network interface 2214 can be internal or external to base station 2205, and it can utilize display interface 2212 for end-user interaction and status information delivery.

Processor 2235 also is functionally connected to communication platform 2215 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 2235 is functionally connected, via data, system, or address bus 2211, to display interface 2212 and broadband network interface 2214 to confer, at least in part, functionality to each of such components.

In base station 2205, memory 2245 can retain location and/or macro sector identifier(s); access list(s) that authorize access to wireless coverage through base station 2205; sector intelligence that includes ranking of macro sectors in the macro wireless environment of base station 2205, radio link quality and strength associated therewith, or the like. Memory 2245 also can store data structures, code instructions and program modules, system or device information, code sequences for scrambling, spreading and pilot transmission, base station configuration, and so on. Processor 2235 is coupled, e.g., via a memory bus, to memory 2245 in order to store and retrieve information used to operate and/or confer functionality to the components, platform, and interface that reside within base station 2205.

With respect to FIG. 23, wireless communication environment 2300 includes handover component 210 and macro network platform 2310, which serves or facilitates communication with mobile device 2395 via radio network 2390. It should be appreciated that in cellular wireless technologies (e.g., 3GPP UMTS, HSPA, 3GPP LTE, 3GPP2 UMB), macro network platform 2310 is embodied in a core network. It is noted that radio network 2390 can include base station(s), base transceiver station(s), or access point(s), and associated electronic circuitry and deployment site(s), in addition to a wireless radio link operated in accordance with the base station(s). Accordingly, radio network 2390 can comprise various coverage cells like cell 105. In addition, it should be appreciated that although handover component 210 is illustrated in FIG. 23 as an entity distinct from other entities, elements, and/or components of wireless communication environment 2300, handover component 210 can be located/included within one or more components/elements, e.g., hardware, software, etc., of wireless communication environment 2300, e.g., macro network platform 2310, radio network 2390, and/or mobile device 2395.

Generally, macro platform 2310 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 2310 includes CS gateway node(s) 2312 which can interface CS traffic received from legacy networks like telephony network(s) 2340, e.g., public switched telephone network (PSTN), or public land mobile network (PLMN), or a SS7 network 2360. Circuit switched gateway 2312 can authorize and authenticate traffic, e.g., voice, arising from such networks. Additionally, CS gateway 2312 can access mobility, or roaming, data generated through SS7 network 2360; for instance, mobility data stored in a VLR, which can reside in memory 2330. Moreover, CS gateway node(s) 2312 interfaces CS-based traffic and signaling and gateway node(s) 2318. As an example, in a 3GPP UMTS network, PS gateway node(s) 2318 can be embodied in gateway GPRS support node(s) (GGSN).

In addition to receiving and processing CS-switched traffic and signaling, PS gateway node(s) 2318 can authorize and authenticate PS-based data sessions with served, e.g., through macro RAN, wireless devices. Data sessions can include traffic exchange with networks external to the macro network platform 2310, like wide area network(s) (WANs) 2350; enterprise networks (NWs) 2370, e.g., enhanced 911, or service NW(s) 2380 like IP multimedia subsystem (IMS). It should be appreciated that local area network(s) (LANs), which may be a part of enterprise NW(s), can also be interfaced with macro network platform 2310 through PS gateway node(s) 2318. Packet-switched gateway node(s) 2318 generates packet data contexts when a data session is established. To that end, in an aspect, PS gateway node(s) 2318 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 2314. It is to be noted that in 3GPP UMTS network(s), PS gateway node(s) 2318 (e.g., GGSN) and tunnel interface (e.g., TTG) comprise a packet data gateway (PDG).

Macro network platform 2310 also includes serving node (s) 2316 that can convey the various packetized flows of information, or data streams, received through PS gateway node(s) 2318. As an example, in a 3GPP UMTS network, serving node(s) can be embodied in serving GPRS support node(s) (SGSN).

As indicated above, server(s) 2314 in macro network platform 2310 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 2310. Data streams can be conveyed to PS gateway node(s) 2318 for authorization/authentication and initiation of a data session, and to serving node(s) 2316 for communication thereafter. Server(s) 2314 can also effect security, e.g., implement one or more firewalls, of macro network platform 2310 to ensure network's operation and data integrity in addition to authorization and authentication procedures that CS gateway node(s) 2312 and PS gateway node(s) 2318 can enact. Moreover, server(s) 2314 can provision services from external network(s), e.g., WAN 2350, or Global Positioning System (GPS) network(s), which can be a part of enterprise NW(s) 2380. It is to be noted that server(s) 2314 can include one or more processors configured to confer at least in part the functionality of macro network platform 2310. To that end, the one or more processors can execute code instructions stored in memory 2330, for example.

In example wireless environment 2300, memory 2330 stores information related to operation of macro network platform 2310. Information can include business data associated with subscribers; market plans and strategies, e.g., promotional campaigns, business partnerships; operational data for mobile devices served through macro network platform; service and privacy policies; end-user service logs for law enforcement; and so forth. Memory 2330 can also store information from at least one of telephony network(s) 2340, WAN 2350, SS7 network 2360, enterprise NW(s) 2370, or service NW(s) 2380.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 24:
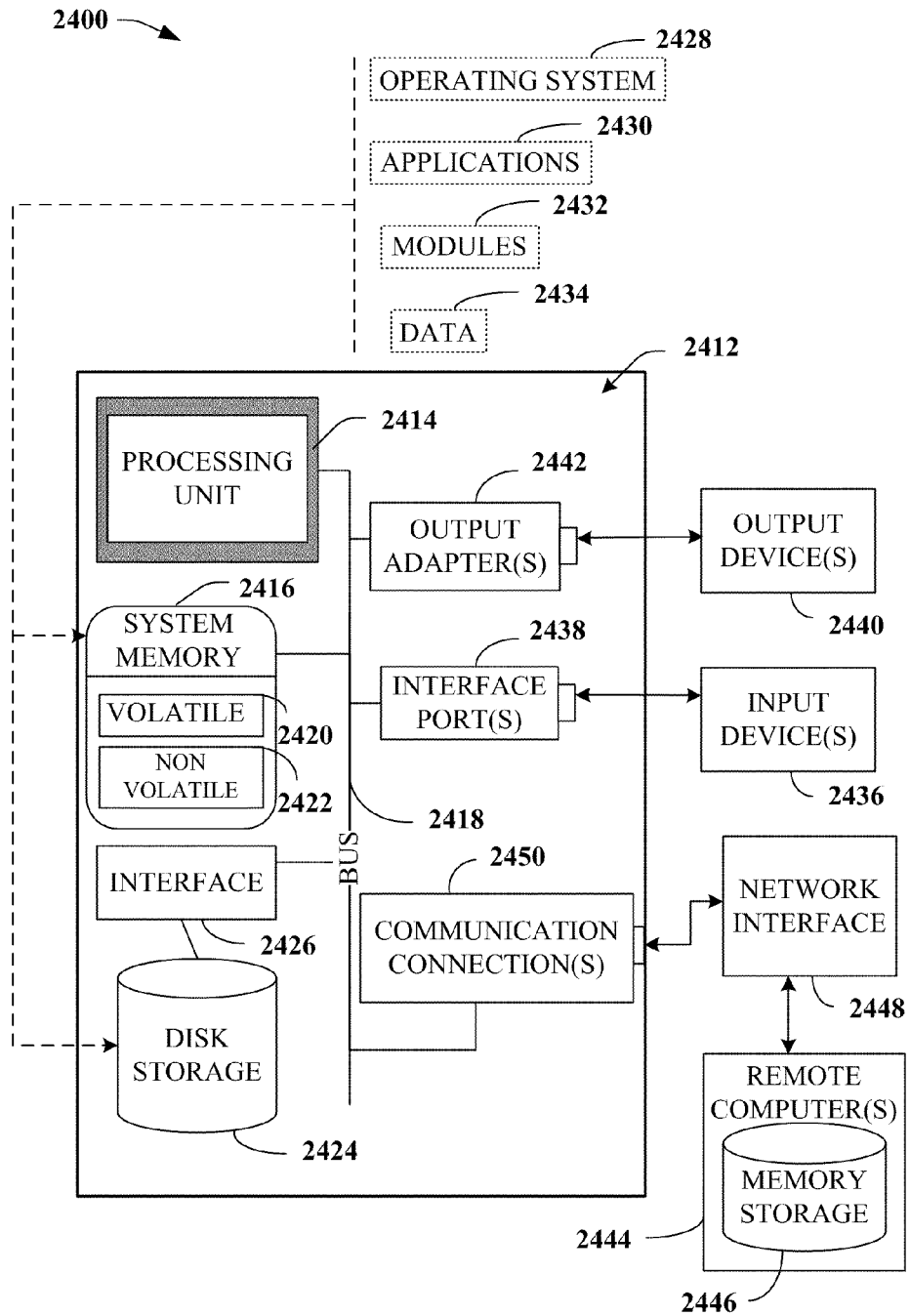
FIG. 24 illustrates a block diagram of a computer operable to execute the disclosed methods and apparatus, in accordance with an embodiment.
Figure 25:
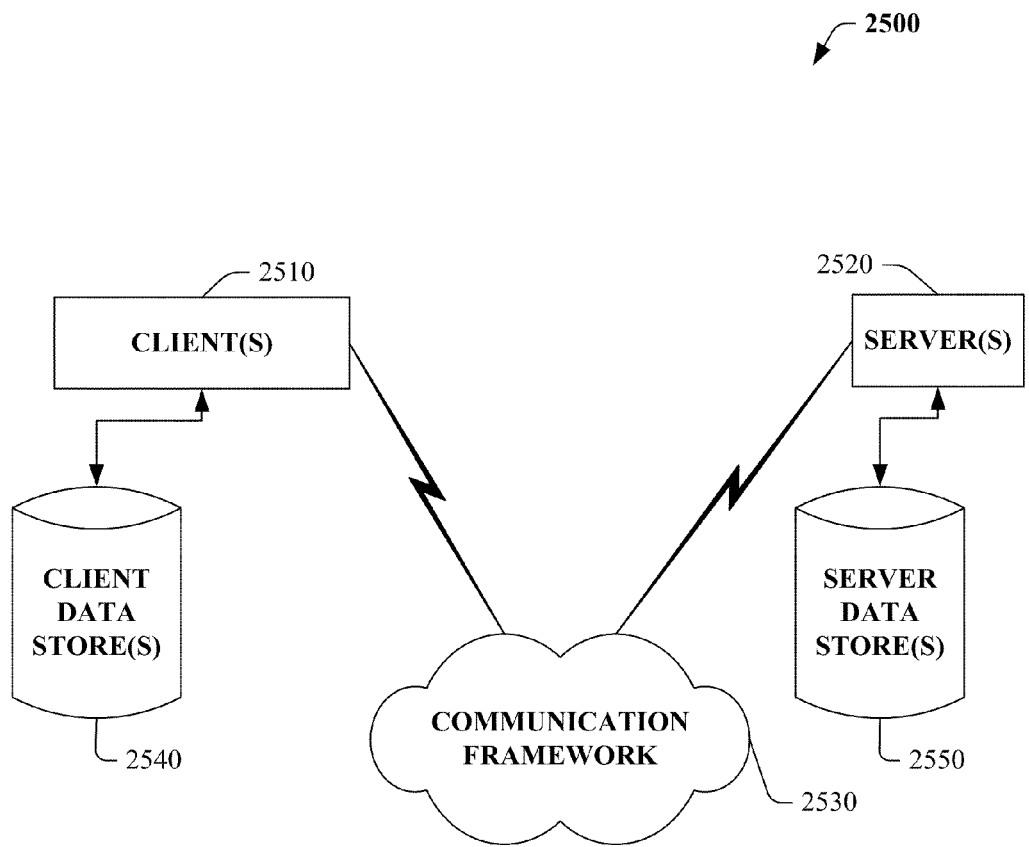
FIG. 25 illustrates a schematic block diagram of an exemplary computing environment, in accordance with an embodiment.

In order to provide a context for the various aspects of the disclosed subject matter, FIGS. 24 and 25, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network; however, some if not all aspects of the subject disclosure can be practiced on stand-alone computers. In a distributed computing environment, program modules may be located in both local and remote memory storage devices.

With reference to FIG. 24, a block diagram of a computer 2400 operable to execute the disclosed systems and methods, in accordance with an embodiment, includes a computer 2412. The computer 2412 includes a processing unit 2414, a system memory 2416, and a system bus 2418. The system bus 2418 couples system components including, but not limited to, the system memory 2416 to the processing unit 2414. The processing unit 2414 can be any of various available processors. Dual microprocessors and other multiprocessor architectures also can be employed as the processing unit 2414.

The system bus 2418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 2416 includes volatile memory 2420 and nonvolatile memory 2422. The basic input/output system (BIOS), containing the basic routines to transfer information between elements within the computer 2412, such as during start-up, is stored in nonvolatile memory 2422. By way of illustration, and not limitation, nonvolatile memory 2422 can include ROM, PROM, EPROM, EEPROM, or flash memory. Volatile memory 2420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2412 also includes removable/non-removable, volatile/nonvolatile computer storage media. FIG. 24 illustrates, for example, disk storage 2424. Disk storage 2424 includes, but is not limited to, devices like a magnetic disk drive, floppy disk drive, tape drive, Jaz drive, Zip drive, LS-100 drive, flash memory card, or memory stick. In addition, disk storage 2424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2424 to the system bus 2418, a removable or non-removable interface is typically used, such as interface 2426.

It is to be appreciated that FIG. 24 describes software that acts as an intermediary between users and the basic computer resources described in the suitable operating environment 2400. Such software includes an operating system 2428. Operating system 2428, which can be stored on disk storage 2424, acts to control and allocate resources of the computer system 2412. System applications 2430 take advantage of the management of resources by operating system 2428 through program modules 2432 and program data 2434 stored either in system memory 2416 or on disk storage 2424. It is to be appreciated that the disclosed subject matter can be implemented with various operating systems or combinations of operating systems.

A user enters commands or information into the computer 2411 through input device(s) 2436. Input devices 2436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2414 through the system bus 2418 via interface port(s) 2438. Interface port(s) 2438 include, for example, a serial port, a parallel port, a game port, and a universal serial bus (USB). Output device(s) 2440 use some of the same type of ports as input device(s) 2436.

Thus, for example, a USB port may be used to provide input to computer 2412, and to output information from computer 2412 to an output device 2440. Output adapter 2442 is provided to illustrate that there are some output devices 2440 like monitors, speakers, and printers, among other output devices 2440, which use special adapters. The output adapters 2442 include, by way of illustration and not limitation, video and sound cards that provide a means of connection between the output device 2440 and the system bus 2418. It should be noted that other devices and/or systems of devices provide both input and output capabilities such as remote computer(s) 2444.

Computer 2412 can operate in a networked environment using logical connections to one or more remote computers, such as remote computer(s) 2444. The remote computer(s) 2444 can be a personal computer, a server, a router, a network PC, a workstation, a microprocessor based appliance, a peer device or other common network node and the like, and typically includes many or all of the elements described relative to computer 2412.

For purposes of brevity, only a memory storage device 2446 is illustrated with remote computer(s) 2444. Remote computer(s) 2444 is logically connected to computer 2412 through a network interface 2448 and then physically connected via communication connection 2450. Network interface 2448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2450 refer(s) to the hardware/software employed to connect the network interface 2448 to the bus 2418. While communication connection 2450 is shown for illustrative clarity inside computer 2412, it can also be external to computer 2412. The hardware/software for connection to the network interface 2448 can include, for exemplary purposes only, internal and external technologies such as, modems including regular telephone grade modems, cable modems and DSL modems, ISDN adapters, and Ethernet cards.

FIG. 25 illustrates a schematic block diagram of an exemplary computing environment 2530, in accordance with an embodiment. The system 2500 includes one or more client(s) 2510. The client(s) 2510 can be hardware and/or software (e.g., threads, processes, computing devices). The system 2500 also includes one or more server(s) 2520. Thus, system 2500 can correspond to a two-tier client server model or a multi-tier model (e.g., client, middle tier server, data server), amongst other models. The server(s) 2520 can also be hardware and/or software (e.g., threads, processes, computing devices). The servers 2520 can house threads to perform transformations by employing the subject innovation, for example. One possible communication between a client 2510 and a server 2520 may be in the form of a data packet transmitted between two or more computer processes.

The system 2500 includes a communication framework 2530 that can be employed to facilitate communications between the client(s) 2510 and the server(s) 2520. The client(s) 2510 are operatively connected to one or more client data store(s) 2540 that can be employed to store information local to the client(s) 2510. Similarly, the server(s) 2520 are operatively connected to one or more server data store(s) 2550 that can be employed to store information local to the servers 2520.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments may be used or modifications and additions may be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory that stores executable instructions; and
   a processor, coupled to the memory, that facilitates execution of the executable instructions to perform operations, comprising:
   determining source cell signal strength data associated with a source cell device and target cell signal strength data associated with a target cell device, wherein the source cell signal strength data corresponds to a device position of a mobile device relative to a source cell position of the source cell device, and wherein the target cell signal strength data corresponds to the device position relative to a target cell position of the target cell device; and
   in response to determining that a difference of a first rate of degradation of the source cell signal strength data over time and a second rate of enhancement of the target cell signal strength data over time exceeds a first defined threshold condition with respect to the difference, and that a projected time corresponding to a predicted source signal level of the source cell device and a predicted target signal level of the target cell device satisfies a second defined condition with respect to a time period, initiating, based on the first defined threshold condition and the second defined condition, a handover comprising a termination, via the source cell device, of a first communication associated with the mobile device and an initiation, via the target cell device, of a second communication associated with the mobile device in replacement of the termination of the first communication.

2. The system of claim 1, wherein the determining the difference comprises determining an increase in a signal quality of the target cell signal strength data.

3. The system of claim 2, wherein the difference corresponds to a slope of a linear regression line.

4. The system of claim 1, wherein the initiating the handover comprises
   initiating the handover in response to the predicted source signal level being determined to be within a predetermined difference from the predicted target signal level.

5. The system of claim 1, wherein the initiating the handover comprises initiating the handover before the projected time.

6. The system of claim 1, wherein the determining comprises determining that an absolute magnitude of the difference satisfies the first defined threshold condition.

7. The system of claim 1, wherein the operations further comprise:
   determining whether the mobile device is stationary; and
   restricting the handover in response to the mobile device being determined to be stationary.

8. The system of claim 7, wherein the operations further comprise:
   assigning a restrictive bias to the target cell signal strength data; and
   restricting the handover based on the restrictive bias.

9. The system of claim 1, wherein the handover is a hard handover, and the operations further comprise:
   determining an acceleration of a change of the target cell signal strength data; and
   modifying, based on the acceleration, a time-to-trigger metric associated with an addition of the target cell device to an active set associated with a soft handover, wherein the active set represents a group of target cell devices eligible for use in the soft handover, and wherein the soft handover comprises a continuation of the first communication during the initiation of the second communication.

10. The system of claim 9, wherein the operations further comprise:
    reducing the time-to-trigger metric.

11. The system of claim 9, wherein the operations further comprise:
    predicting an initiated time to initiate the soft handover based on the acceleration;
    determining whether the initiated time is within the time-to-trigger metric; and
    reducing the time-to-trigger metric in response to the initiated time being determined to satisfy a third defined condition with respect to the time-to-trigger metric.

12. The system of claim 11, wherein the reducing the time-to-trigger metric comprises reducing the time-to-trigger metric by an amount of time associated with an allocation of resources corresponding to the addition of the target cell device to the active set.

13. The system of claim 9, wherein the operations further comprise:
    removing the target cell device from the active set based on the target cell signal strength data.

14. The system of claim 13, wherein the removing the target cell device comprises removing the target cell device from the active set based on the second rate of change of the target cell signal strength data.

15. The system of claim 1, wherein the system is a base station controller device.

16. The system of claim 1, wherein the system is a mobile device.

17. A method, comprising:
    receiving, by a system comprising a processor, source cell information corresponding to a first signal strength associated with a source cell device, and
    target cell information corresponding to a second signal strength associated with a target cell device, wherein the source cell information corresponds to a position of a mobile device relative to the source cell device, and wherein the target cell information corresponds to the position of the mobile device relative to the target cell device;
    determining, by the system based on a function of the source cell information and the target cell information with respect to time, whether a difference comparison of a source signal rate of degradation of the first signal strength and a target signal rate of enhancement of the second signal strength satisfies a defined rate threshold condition with respect to exceeding the difference of the source signal rate of degradation and the target signal rate of enhancement; and in response to the difference of the source signal rate of degradation and the target signal rate of enhancement being determined to exceed a first defined threshold condition with respect to the difference, and in response to a projected time corresponding to a projected source signal strength associated with the source cell device and a projected target signal strength associated with the target cell device being determined to satisfy a defined time condition, initiating, by the system, a handover comprising a termination, via the source cell device, of a first communication, associated with the mobile device, and an initiation, via the target cell device, of a second communication following the termination of the first communication.

18. The method of claim 17, wherein the determining comprises determining a trend in the source signal rate of degradation and the target signal rate of enhancement.

19. The method of claim 17, wherein the determining comprises:
   computing linear regression lines based on the first signal strength and the second signal strength; and
   determining the source signal rate of degradation and the target signal rate of enhancement based on slopes of the linear regression lines representing changes of the first signal strength and the second signal strength per unit of time.

20. The method of claim 17, further comprising:
   predicting, by the system, the projected source signal strength and the projected target signal strength.

21. The method of claim 17, wherein the initiating comprises initiating the handover before the projected time.

22. A computer readable storage device comprising executable instructions that, in response to execution, cause a system comprising a processor to perform operations, comprising:
   receiving signal strength data corresponding to a position of a mobile device with respect to positions of a source cell device and a target cell device;
   determining, based on a function of the signal strength data with respect to time, whether a difference of a first rate of degradation of a first signal strength and a second rate of enhancement of a second signal strength satisfies a defined rate threshold condition with respect to the difference; and
   in response to the difference being determined to satisfy the defined rate threshold condition, and in response to a projected time corresponding to predicted signal strength data associated with the source cell device and the target cell device being determined to satisfy a defined period condition, modifying, based on the defined rate threshold condition and the defined period condition, an active set representing target cell devices as candidates for a handover representing a communication transfer corresponding to the mobile device and a selected target cell device of the target cell devices.

23. The computer readable storage device of claim 22, wherein the determining comprises:
   determining linear regression lines based on the first signal strength and the second signal strength; and
   determining the first rate of degradation and the second rate of enhancement based on slopes of the linear regression lines representing changes of the first signal strength and the second signal strength per unit of time.

* * * * *